de IEEE, vol. 68, No. 3, Mar. 1980, pp. 366-406.

United States Patent [19]
Campbell et al.

[11] Patent Number: 4,580,134
[45] Date of Patent: Apr. 1, 1986

[54] COLOR VIDEO SYSTEM USING DATA COMPRESSION AND DECOMPRESSION

[75] Inventors: Graham M. Campbell, DeKalb; Thomas A. DeFanti, Chicago, both of Ill.

[73] Assignee: Real Time Design, Inc., Chicago, Ill.

[21] Appl. No.: 442,024

[22] Filed: Nov. 16, 1982

[51] Int. Cl.$^4$ .............................................. G09G 1/28
[52] U.S. Cl. .................................... 340/703; 340/725; 340/747; 340/798; 358/133
[58] Field of Search ............... 340/701, 703, 723, 724, 340/725, 726, 727, 747, 748, 750, 792, 798, 799; 358/133, 134, 135, 138

[56] References Cited

U.S. PATENT DOCUMENTS

| | | |
|---|---|---|
| 3,580,999 | 3/1971 | Mounts . |
| 3,813,485 | 5/1974 | Arps . |
| 3,976,826 | 8/1976 | Fullton, Jr. . |
| 4,070,694 | 1/1978 | Sakamoto et al. .................. 358/133 |
| 4,074,254 | 2/1978 | Belser et al. . |
| 4,092,675 | 5/1978 | Saran ................................ 358/261 |
| 4,093,962 | 6/1978 | Ishiguro et al. ..................... 358/138 |
| 4,112,422 | 9/1978 | Mayer et al. . |
| 4,125,873 | 11/1978 | Chesarek ............................ 364/900 |
| 4,134,134 | 1/1979 | Lux ................................... 358/280 |
| 4,136,363 | 1/1979 | Saran ................................ 358/261 |
| 4,149,145 | 4/1979 | Hartke et al. ....................... 340/739 |
| 4,149,152 | 4/1979 | Russo ................................ 340/703 |
| 4,165,072 | 8/1979 | Stubben ............................... 273/85 |
| 4,169,272 | 9/1979 | Rains et al. ......................... 358/180 |

(List continued on next page.)

FOREIGN PATENT DOCUMENTS

2477745 3/1980 France .

OTHER PUBLICATIONS

*Proceedings of the IEEE*, vol. 60, No. 7, Jul. 1972, "Transform Picture Coding", Paul A. Wintz, pp. 809-820.
Delp & Mitchell, "Image Compression Using Block Truncation Coding," IEEE Trans. on Comm., vol. COM-27, No. 9, Sep. 1979, pp. 1335-1342.
Netravali & Limb, "Picture Coding: A Review," Proc. of the IEEE, vol. 68, No. 3, Mar. 1980, pp. 366-406.
Friedberg, "Frame Buffer Architecture," Siggraph/81, Monday, Aug. 3, 1981, pp. III-1 to III-14.
Dill, "Low Level Raster Graphics," Siggraph/81, Monday, Aug. 3, 1981, p. V-22.
Smith, "Painting Tutorial Notes," Siggraph/81, Monday, Aug. 3, 1981, pp. 31-35.
Pavlidis, *Algorithms for Graphics and Image Processing*, Computer Scient Press, Rockville, Md. ©1982, pp. 1-14, 51-54, 57.
Ciarcia, "High-Resolution Sprite-Oriented Color Graphics," *Byte*, Aug. 1982, pp. 57-76, 78, 80.

*Primary Examiner*—Gerald L. Brigance
*Attorney, Agent, or Firm*—Leydig, Voit & Mayer, Ltd.

[57] ABSTRACT

A method of generating a color video display comprises the steps of dividing a color image to be displayed into a matrix of blocks, each block comprising a matrix of pixels; storing data identifying a multiplicity m of different colors, the data being stored in a color map memory having a unique address for the data identifying each different color; selecting different pairs of the m colors for different blocks of the color image to be displayed; generating a pixel data bit for each pixel in each of the different blocks, the value of each pixel data bit identifying one of the pair of colors selected for the block in which the corresponding pixel is located; generating different pairs of binary numbers representing the color map memory addresses of the different pairs of the m colors selected for different blocks; reading out of the color map memory the stored data representing the particular color selected for each pixel, in response to the data bit for that pixel and the corresponding one of said binary numbers representing the address of one of the colors selected for the block containing that pixel; and using the data read out of the color map memory to generate a video display comprised of pixels having the selected colors as identified by the data read out of the color map memory.

46 Claims, 25 Drawing Figures

U.S. PATENT DOCUMENTS

| | | | |
|---|---|---|---|
| 4,173,771 | 11/1979 | Iijima | 358/135 |
| 4,179,709 | 12/1979 | Workman | 358/133 |
| 4,189,728 | 2/1980 | Stubben | 340/725 |
| 4,189,748 | 2/1980 | Reis | 358/133 |
| 4,200,867 | 4/1980 | Hill | 340/798 |
| 4,204,227 | 5/1980 | Gurley | 358/138 |
| 4,205,341 | 5/1980 | Mitsuya et al. | 358/135 |
| 4,225,861 | 9/1980 | Langdon, Jr. et al. | 340/703 |
| 4,238,768 | 12/1980 | Mitsuya et al. | 358/135 |
| 4,258,393 | 3/1981 | Ejiri et al. | 358/283 |
| 4,266,249 | 5/1981 | Chai et al. | 358/260 |
| 4,270,125 | 5/1981 | Weisbecker | 340/744 |
| 4,275,413 | 6/1981 | Sakamoto et al. | 358/80 |
| 4,280,138 | 7/1981 | Stock | 358/150 |
| 4,290,084 | 9/1981 | Minshull et al. | 358/260 |
| 4,302,775 | 11/1981 | Widergren et al. | 358/136 |
| 4,317,114 | 2/1982 | Walker | 340/747 |
| 4,319,267 | 4/1982 | Mitsuya et al. | 358/75 |
| 4,325,075 | 4/1982 | Kashigi et al. | 358/13 |
| 4,326,202 | 4/1982 | Kidode et al. | 340/799 |
| 4,329,710 | 5/1982 | Taylor | 358/81 |
| 4,346,402 | 8/1982 | Pugsley | 358/80 |
| 4,346,405 | 8/1982 | Yoda et al. | 358/105 |
| 4,353,092 | 10/1982 | Bailey et al. | 358/160 |
| 4,359,223 | 11/1982 | Baer et al. | 273/85 G |
| 4,364,037 | 12/1982 | Walker | 358/133 |
| 4,368,461 | 1/1983 | Komatsu et al. | 340/703 |
| 4,439,760 | 3/1984 | Fleming | 340/703 |
| 4,441,104 | 4/1984 | Finney, II | 340/725 |
| 4,484,187 | 11/1984 | Brown et al. | 340/725 |

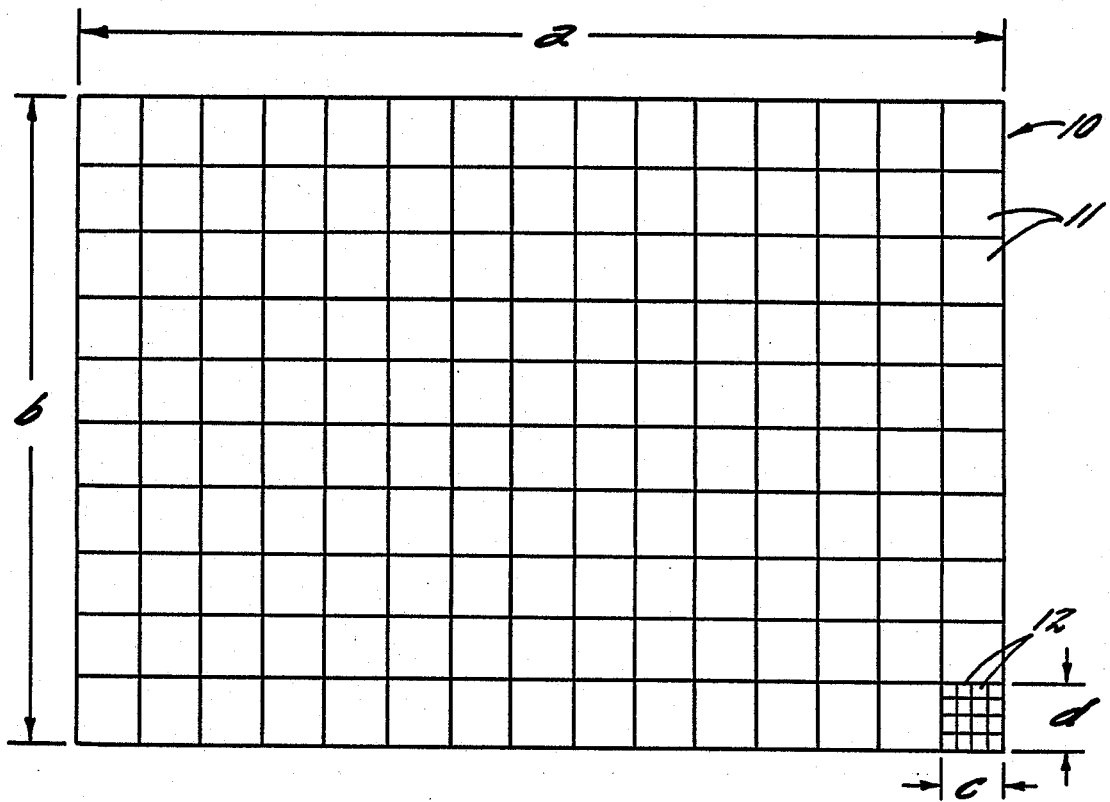
Fig. 1.
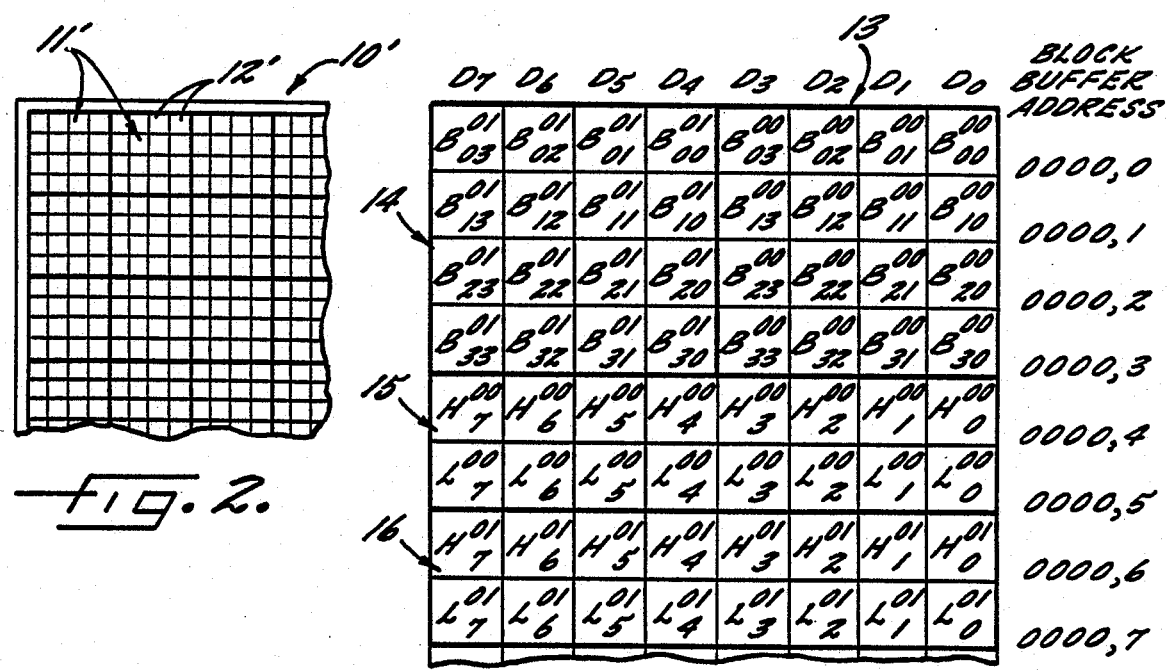
Fig. 2.
Fig. 3.

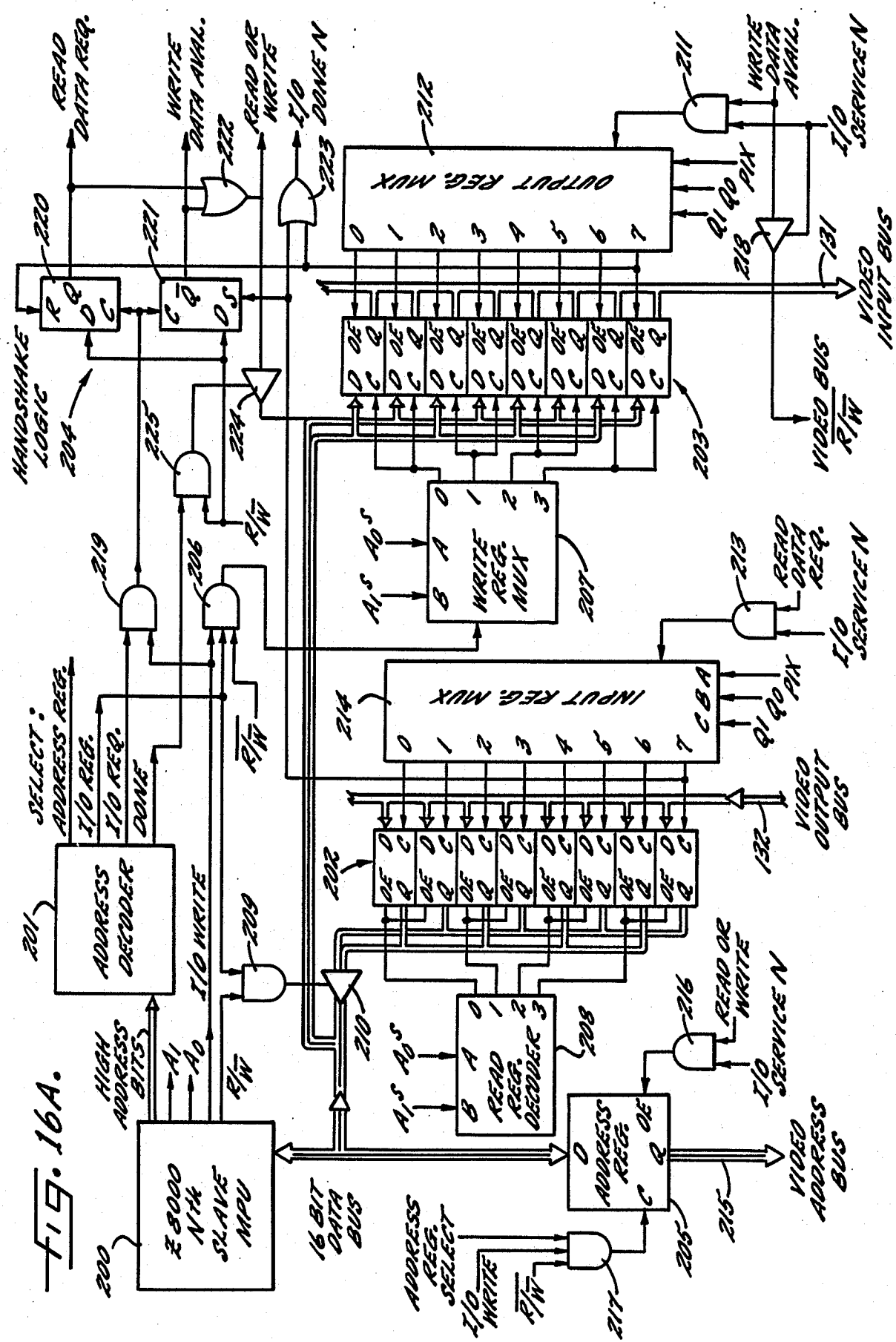

COLOR VIDEO SYSTEM USING DATA COMPRESSION AND DECOMPRESSION

BACKGROUND OF THE INVENTION

The present invention relates generally to digital color video systems and, more particularly, to systems for encoding, transmitting, storing, decoding and/or generating color video displays of color images. The principal embodiments of the invention relate specifically to digital animated color video graphics systems which can be used for video games and the like.

OBJECTS OF THE INVENTION

It is a primary object of the present invention to provide an improved digital color video system which produces excellent video picture quality and a high degree of versatility while using an extremely small amount of encoded data. In this connection, more specific objects of the invention are to provide such a system which has the capability of producing smooth transitions between regions of changing color within the displayed image; a high degree of resolution; precise gradations of brightness and hue throughout the displayed image; and elimination of false contours.

Another principal objective of this invention is to provide such an improved digital color video system which is capable of producing vastly improved video games—from the standpoint of picture quality, detail, and versatility—at a cost which renders the system commercially feasible for both arcade games and home games. A related objective is to provide such a system which offers the same advantages in other animated color video graphics applications.

It is still another important object of this invention to provide an improved animated color video graphics system which permits the entire image to be easily and quickly changed to a different color format without re-encoding the image. For example, red and yellow images on a blue background can be easily and quickly changed to yellow and blue images on a red background without re-encoding the image.

It is a further object of this invention to provide an improved animated color video graphics system which permits a wide range of color gradations so that an extensive range of detail is available to the graphics designer.

A still further object of this invention is to provide such an improved animated color video graphics system which permits generation of animated displays with a high degree of realism, including the expression of emotions, with a minimum of encoded data.

Other objects and advantages of the invention will become apparent from the following detailed description and the accompanying drawings.

BRIEF DESCRIPTION OF THE DRAWINGS

FIG. 1 is an illustration of a picture area subdivided into blocks of pixel matrices for encoding purposes;

FIG. 2 is an enlargement of one corner of the picture area shown in FIG. 1, illustrating the pixel matrices in the various block;

FIG. 3 is a diagram of a digital data word containing encoded data for two of the blocks of pixel matrices in FIGS. 1 and 2;

FIG. 16A is a schematic diagram of a slave microprocessor circuit permitting up to eight slave processors to run simultaneously and access the block buffer as configured in FIG. 14A via the input and output video busses;

Figure 4:
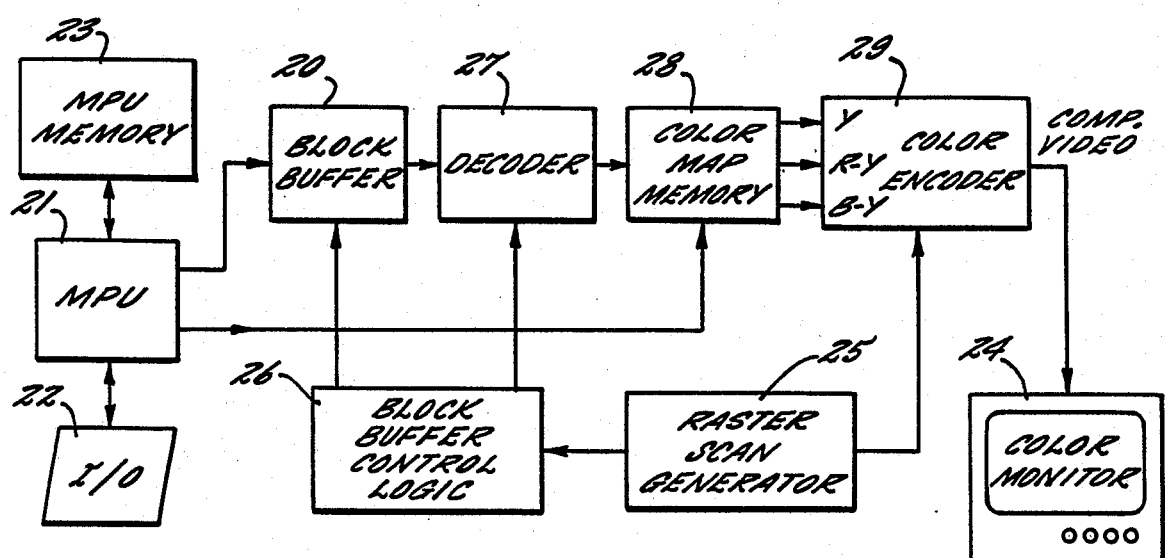
FIG. 4 is a block diagram of a digital electronic system for storing and decoding digital data representing the picture of FIGS. 1 and 2 and generating an animated video display therefrom.

While the invention is susceptible to various modifications and alternative forms, specific embodiments thereof have been shown by way of example in the drawings and will be described in detail herein. It should be understood, however, that it is not intended to limit the invention to the particular forms disclosed, but, on the contrary, the intention is to cover all modifications, equivalents, and alternatives falling within the spirit and scope of the invention as defined by the appended claims.

DESCRIPTION OF THE PREFERRED EMBODIMENT

Numerous techniques have been proposed for encoding and decoding both black-and-white and color pictures. Among these are so-called block coding techniques which divide a given picture into a matrix of blocks, each of which is in turn divided into a matrix of picture elements, commonly referred to as "pixels" or "pels". In the illustration in FIG. 1, for example, a picture 10 is divided into a matrix a×b of blocks 11, and each block 11 is divided into a matrix c×d of pixels 12. To encode the picture 10 into digital data which can be stored and/or transmitted and then decoded and used to generate a video display of the original picture 10, certain information must be encoded for every pixel 12 of every block 11. The amount of data required per pixel, generally expressed in units of "bits/pixel", is an important characteristic of any picture coding system, but of equal or greater importance are the quality and detail of the picture that can be generated from the decoded data and the versatility of the system. These latter features are particularly important when the system is to be used for video games or other kinds of animated video graphics.

In accordance with one important aspect of the present invention, data identifying a multiplicity m of different colors is stored in a color map memory having a unique address for the data identifying each different color; different pairs of the m colors are selected for different blocks of the color image to be displayed; a pixel data bit is generated for each pixel in each of the different blocks, the value of each pixel data bit identifying one of the pair of colors selected for the block in which the corresponding pixel is located; binary numbers are generated to represent the color map memory addresses of the different pairs of colors selected for different blocks; data representing the particular color selected for each pixel is read out of the color map memory in response to the data bit for that pixel and the binary numbers representing the addresses of the colors selected for the block containing that pixel; and the data read out of the color map memory is used to generate a video display comprised of pixels having the selected colors as specified by that data.

By confining the choice of colors to a preselected group of colors m, the system of this invention permits a small number of data bits to represent a large amount of picture information, thereby permitting relatively complex images to be displayed in great detail, and animated, from a relatively small amount of encoded data. For example, there is no need to have separate code data for each different color component of a given pixel. All the information needed for a faithful display of any one of the preselected colors m is stored in the color map memory. Thus the only information required to be encoded is the memory address for the desired color for the various pixel locations. During decoding, the memory addresses identify the desired colors for the various pixels, and data specifying the colors are read out of the corresponding memory locations. The use of address numbers having only eight bits, for example, permits each pixel to have any of 256 colors ($m=2^8$), each with a prescribed hue and intensity.

Even more important from the standpoint of video games and other animated video graphics, is the fact that the pattern of pixel colors can be easily changed in successive frames of the video display. Such changes can be effected by simply changing the color map addresses for those pixels in the image areas to be changed, which can be done by changing a relatively small amount of encoded data through the use of a high-speed microprocessor. As an alternative to, or an embellishment of, changing the color map addresses, the data in the color map memory itself can also be changed, again through the use of the high speed microprocessor. If desired, multiple color maps can be included in the system, with the microprocessor choosing among them as required to achieve the desired animation effects in the video display.

Preferably, only two of the m colors in the color map memory are selected for each block of pixels. That is, every pixel in a given block must have one of the two colors selected for that particular block. Consequently, the color of each pixel can be represented by only a single data bit—either a "1" or a "0"— in combination with two binary numbers per block, representing the color map memory addresses for the two colors selected for each block. Thus, if a block comprises a 4×4 pixel matrix, the colors of the 16 pixels in that matrix can be represented by a total of only 32 bits: two 8-bit numbers representing the memory addresses of the two colors selected for that block, and one bit indicating which of the two colors has been selected for each of the 16 pixels in that block. The end result is an extremely versatile color image storage, transmission, and display system which requires only 2 bits per pixel and which can be easily modified in successive frames to produce a high quality animated display with intricate detail.

In this two-colors-per-pixel-data-bit embodiment it is possible to use two different color maps for decoding each block, one being selected if the pixel data bit associated with the color map address is a logical one, and the other being selected if the pixel data bit is a logical zero. This effectively doubles the number of colors available. It is true that in this case any pair of colors in the two color maps cannot be arbitrarily encoded in a single pixel block, since a pair of different colors from the same color map cannot be encoded in a single block. But the availability of a large number of colors is important in representing subtle shades or gradations of color. More subtle gradations in color can be encoded in a single block if two different color maps are used and if the colors in one of the two maps differ only slightly from the colors in the other map. The colors in one map, for example, can be offset by about one-half of the resolution step or color increment in the other map so that the resolution step or color increment across the gradation of color is effectively cut in half. Then the visual impact of "block contours", resulting from the fact that the colors change at block boundaries, is reduced. For encoding a block of all the same color, any of the doubled number of colors may be selected. Morever, if a block is encoded with two similar colors, any pair of the doubled number of similar colors may be selected for encoding the block, since every pair of similar colors is comprised of a color from one color map and a color from the other memory map.

In practice, the two memory maps are preferably stored in the same memory integrated circuits, and one of the address lines to the memory integrated circuits receives a logic signal representing the logical value of the pixel data bit to select the desired one of the two memory maps.

Another embodiment uses the same memory integrated circuit, but changes the color displayed by slightly modifying the color specified by the data from the memory integrated circuit depending on the logical value of the pixel data bit. The brightness or intensity of the color, for example, is changed by half a resolution step. If a digital-to-analog converter generates a luminance or Y signal from the data read from the color memory, the modification can be done merely by adding an attenuated version of the binary signal representing the pixel bit to the output or reference of the digital-to-analog converter. The portion of the binary signal should change the luminance or Y signal by one-half of the minimum step or least significant bit value of the analog-to-digital converter.

It should be noted that more than two colors could be encoded per block, and for additional color resolution a separate color map memory could be used for each combination of color indicating pixel bits. A particular embodiment, for example, could use two pixel bits per pixel, specifying one of four possible colors per 4×4 pixel block. With eight-bit color map memory addresses, this four color embodiment would require an information density of four bits per pixel.

It will be appreciated that these features of the invention are not limited to blocks of 16 pixels. Blocks may be defined by pixel matrices of varying sizes. For example, blocks defining 2×2 pixel matrices can be represented by 20 bits/ block, or 5 bits/pixel: 16 bits for the two color addresses and 4 bits for the pixel color selections. Similarly, blocks defining 8×8 pixel matrices can be represented by 80 bits/ block or 1.25 bits/pixel: 16 bits for the two color addresses and 64 bits for the pixel color selections.

Nor is the invention limited to 8-bit color addresses, which provide 256 color selections (m=256). For example, with blocks defining 4×4 pixel matrices, the use of 4-bit color addresses would require only 24 bits/block or 1.5 bits/pixel; this system would offer only 16 color selections (m=16), but such a limited selection can be adequate for certain simple graphic images. For much more sophisticated displays, the color addresses can be increased to 16 bits, which would provide 65,536 color selections (m=$2^{16}$) with 48 bits/block or 3 bits/pixel for 4×4 blocks.

For video games, blocks defining 4×4 pixel matrices and two bits/pixel encoding using eight-bit color addresses are particularly useful. Not only does it provide sufficient color selections for video games, but it also permits the use of a highly efficient video encoded video memory or "block buffer" organization. This particular pixel organization is shown in FIG. 2 for a color picture 10', and the corresponding block buffer memory organization is shown in FIG. 3. The block buffer is organized into 64-bit words, each word representing a pair of horizontally adjacent picture blocks 11'. One such word is illustrated in FIG. 3.

The primary advantage of this block buffer memory organization is that the block buffer may be a dual port memory having a reasonably slow cycle time of approximately 320 nanoseconds while providing a relatively high resolution display of 640 active pixels per line with 480 active lines per frame at the standard NTSC television frame rate of 30 interlaced frames per second. These numbers give square pixels, and a standard 3:4 aspect ratio. The numbers are also divisible by four and eight to simplify coding in 4×4 blocks of pixels. For each pair of picture blocks 11', a 64-bit data word such as the one shown in FIG. 3 is read from a block buffer, and the bits B corresponding to the pixels 12' are scanned or multiplexed in a serial fashion to generate a video signal. The video signal is generated from the bits B by associating each of the bits with a particular one of two color map memory addresses $H_0$-$H_7$ and $L_0$-$L_7$ selected for each of the picture blocks 11'.

In order to facilitate the serial multiplexing of the bits B corresponding to individual pixels, and to further facilitate the association of each of the bits B with a respective one of two color map memory addresses for each picture block 11', each block buffer memory word is organized into an 8-bit by 8-bit matrix having two upper quadrants 13, 14 and two lower pairs of 8-bit bytes 15, 16. The two upper quadrants 13, 14 comprise two separate 4×4 pixel bit maps of the corresponding picture blocks 11'. More specifically, the quadrant 13 comprises a 4×4 matrix of bits representing the 4×4 pixel matrix of the left-hand block 11' in FIG. 2; and the quadrant 14 comprises a similar 4×4 matrix of bits $B^{01}$ representing the 4×4 pixel matrix of the right-hand block 11' in FIG. 2. Each of the two 4×4 pixel matrices comprises four rows of bits $B_{00}$-$B_{03}$, $B_{10}$-$B_{13}$, $B_{20}$-$B_{23}$ and $B_{30}$-$B_{33}$, as illustrated in FIG. 3. The subscripts of these bits denote the row and column coordinates of the corresponding pixels in FIG. 2, and the superscripts denote the row and column coordinates of the blocks 11' in FIG. 2. Thus the bit $B_{21}^{01}$ corresponds to the second pixel from the left boundary, and the third pixel from the top, of the second block from the left boundary of the top row of blocks in the picture 10'. Note that this follows the digital electronics conventions (1) that counting starts with zero instead of one and (2) that scanning of a digital word starts from the least significant bit position, from right to left, while scanning of the picture 10' proceeds left to right.

The two pairs of 8-bit bytes 15, 16 comprising the lower half of the word in FIG. 3 comprise the two color map memory addresses selected for the two blocks 11'. More specifically, the two bytes 15 comprise the two 8-bit addresses $H_0^{00}$-$H_7^{00}$ and $L_0^{00}$-$L_7^{00}$ selected for the left-hand block 11', while the two bytes 16 comprise the selected addresses $H_0^{01}$-$H_7^{01}$ and $L_0^{01}$-$L_7^{01}$ for the right-hand block 11'. The superscripts of these bits H and L correspond to those used with the pixel bits B, denoting the row and column coordinates of the respective blocks 11' with which the various color-address bytes 15 and 16 are associated.

Since there is a one-to-one correspondence and also a geometrical similarity between the pixel bit maps 13, 14 in FIG. 3 and the pixels 12' in the picture blocks 11' of FIG. 2, it is easy to modify the picture 10' by modifying the bits in the bit maps 13, 14. For example, if the bit $B_{00}^{00}$ is changed from a "1" to a "0", the color of the corresponding pixel 12' will be changed from the color addressed by byte $H_0^{00}$-$H_7^{00}$ to the color addressed by byte $L_0^{00}$-$L_7^{00}$. Alternatively, or additionally, the color map memory addresses themselves may be modified by changing the value of one or more bits in the color address bytes $H_0^{00}$-$H_7^{00}$ and $L_0^{00}$-$L_7^{00}$.

Generally speaking, the decoding process is performed by determining the current word in the block buffer for a given pair of pixel blocks, specified by a block buffer address, and reading that block buffer word into a set of eight temporary storage registers 0-7 (43 in FIG. 5, to be described in more detail below). For the particular word shown in FIG. 3, for example, the eight registers receive the eight respective rows of data making up the 64-bit word shown in a square 8×8 matrix form. That is, the first four rows of data containing the pixel bit maps 13, 14 are fed into the first four 8-bit registers 0–3, and the last four rows of data containing the color addresses 15 and 16 are fed into the last four 8-bit registers 4–7.

To display the pixel blocks 11′, one of the 8-bit registers 0–3 is selected and is serially read starting with the least significant data bit $D_0$ of the register and sequentially shifting to the most significant bit $D_7$. The first four bits $D_0$–$D_3$ of each of the first four registers 0–3 correspond to the left-hand pixel block 11′ in FIG. 2, and each of these bits identifies a particular one of the two corresponding color map memory address bytes 15 which are fed into the fifth and sixth 8-bit registers 4 and 5. That is, each of the data bits $D_0$–$D_3$ of registers 0–3 selects one of the two color addresses 15, depending on whether the particular value of the respective data bits $D_0$–$D_3$ is a logic "1" or "0".

Similarly, the last four data bits $D_4$–$D_7$ of each of the first four registers 0–3 correspond to the right-hand pixel block 11′ in FIG. 2, and each of these bits identifies a particular one of the two corresponding color memory address bytes 16 which are fed into the seventh and eighth 8-bit registers 6 and 7. That is, each of the data bits $D_4$–$D_7$ of registers 0–3 selects one of the two color memory addresses 16 stored in registers 6–7. If the value of the data bits $D_4$–$D_7$ is a "1", the color address in register 6 is identified by that particular data bit; if the value of the data bit $D_4$–$D_7$ is a "0", it identifies the color address in register 7.

Thus, the output of the decoding process is a serial stream of 8-bit color map memory addresses, each successive address being identified by one of the pixel bits B corresponding to the pixels 12′. Each color map memory address identifies a corresponding pixel color stored in the color map memory so that the data stored in this memory can be used to generate the desired color video image.

A block diagram of the hardware for performing the above described decoding and video display process in one exemplary system is shown in FIG. 4. Thus, a block buffer 20 is loaded, and its contents thereafter modified, by a microprocessor 21. The encoded video data to be loaded into the block buffer 20 is supplied by a suitable input/output device 22 such as a magnetic disc or tape drive; alternatively, the encoded video data can be permanently stored in a read only memory (ROM). The sequence of instructions or program executed by the microprocessor 21 is stored in a microprocessor memory 23. For video game applications, at least part of the microprocessor memory 23 may be a read only memory (ROM) having a fixed game program; alternatively the game program may be read in from the input-output device 22, such as a tape reader, and transferred by the microprocessor 21 to random access (RAM) microprocessor memory 23.

In a typical video game, one of the first functions performed by the microprocessor 21 is to load the block buffer 20 with encoded video data representing the background scene of the video game. As an alternative, part of the block buffer 20 can be ROM containing a permanent background scene, and another part can be overlaid RAM for storing moving or changing portions of the video image. During the course of the video game, the video display is modified by the superposition of moving animated areas which are under the direction of the microprocessor 21, which responds to input signals from both the game player(s) and the microprocessor program. As far as the microprocessor 21 is concerned, whatever information is transferred to the block buffer 20 is automatically displayed on the color monitor 24 without further intervention by the microprocessor 21. For versatility, however, certain parameters in the decoding process may be alterable by the microprocessor 21, and this alteration is typically done during the vertical blanking interval of the color monitor 24 (as described in more detail below) so that the decoding of data in the block buffer 20 is not disrupted by any changes in the decoding parameters.

The decoding of the data in the block buffer 20 is orchestrated by a raster scan generator 25 which addresses successive pixels in the display of the color monitor 24. Block buffer control logic 26 receives synchronization signals from the raster scan generator 25 and determines which block buffer words are to be decoded. The decoding is performed by a decoder 27 which has registers to receive the current block buffer word and decoding logic for selecting the proper color map memory address identifying the color of the current pixel to be displayed by the color monitor 24. Thus, the output of the decoder 27 is a sequence of memory addresses which are transferred to the color map memory 28 to select the particular colors to be displayed.

The microprocessor 21 can also modify the set of colors stored in the color map memory 28 so that over the course of the video game a very large set of colors can be utilized to achieve the desired visual and emotional effects. Moreover, particular color map memory locations corresponding to particular addresses may be reserved for particular game symbols so that the microprocessor unit 21 may change the colors of those symbols, irrespective of the location of the symbol in the video display, merely by changing the contents of the color map memory at those particular locations.

The data stored in each address location in the color map memory 28 is the data needed to generate a video display of a pixel having one of the m preselected colors. The preferred format for storing the data in the color map memory depends on the kind of video modulation needed for driving the color monitor. For the consumer or home game market, the video modulation must comply with NTSC standards to be accepted by the home player's color TV broadcast receiver. In this case the data will identify a desired luminance level Y and two desired chrominance levels (R-Y) and (B-Y) in order to simplify NTSC encoding. As this data is read out of the memory 28, it is fed to a color encoder 29 of conventional design which further combines the color video data with synchronization and blanking signals from the raster scan generator 25 to derive a composite video signal for driving the color monitor 24. For coin-operated games, however, it is preferable to store primary color components R, G, and B in the color map memory 28; these R, G and B signals can be separately fed directly to the color guns of the CRT in an RGB monitor, thereby bypassing and eliminating the complexity and signal degradation caused by the NTSC encoding and decoding process.

Figure 5:
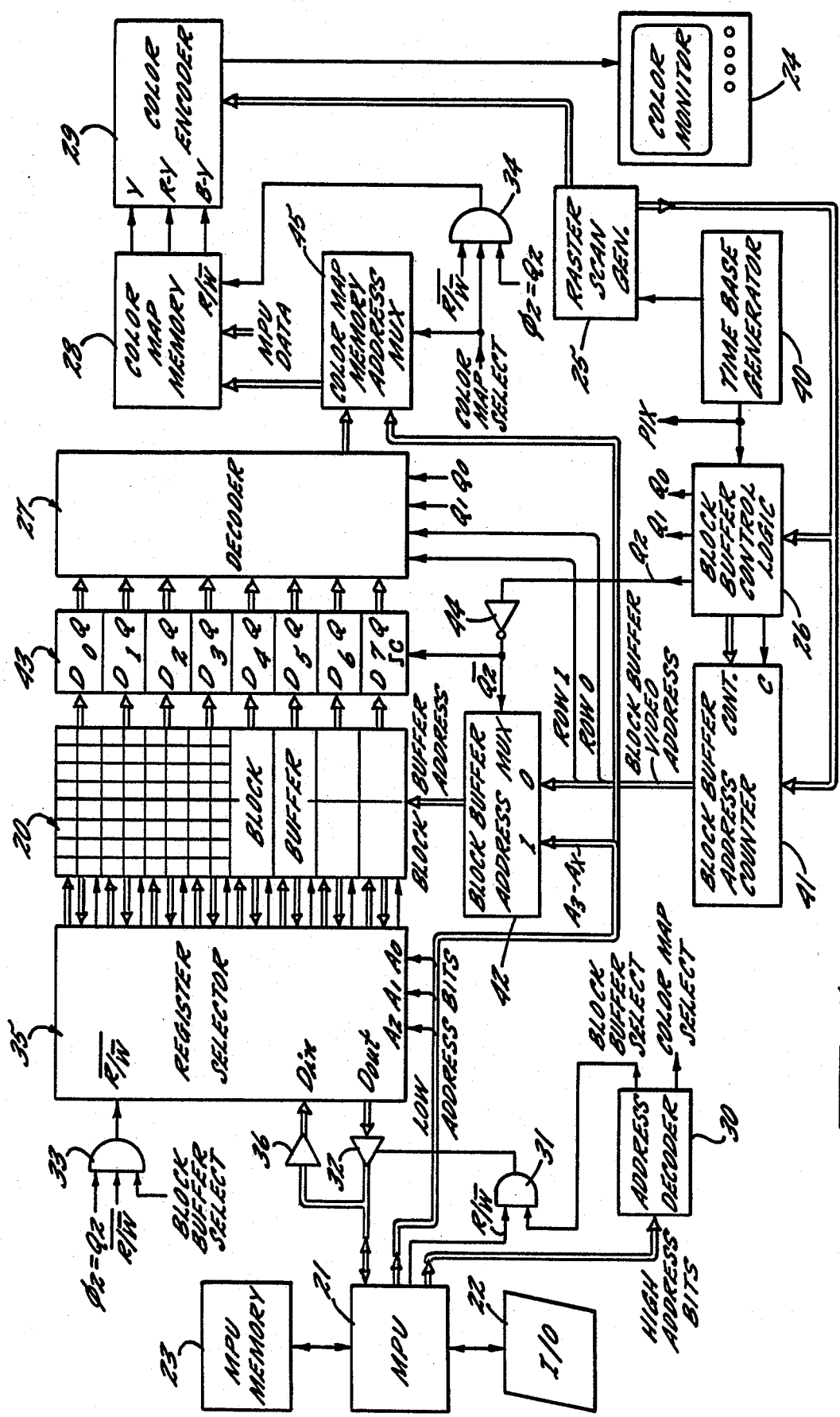
FIG. 5 is a more detailed functional block diagram of the system illustrated in FIG. 4.

FIG. 5 is a functional block diagram of a simple video game system as outlined in FIG. 4, showing in further detail how the major components are interfaced. The microprocessor 21 is connected to the block buffer 20 and color map memory 28 via the microprocessor's address and data busses. The high or most significant address bits, for example, $A_{10}$–$A_{15}$ for a microprocessor having 16 address bits, are fed to an address decoder to generate BLOCK BUFFER SELECT and COLOR MAP SELECT signals when the high address bits assume respective predetermined combinations specifying the location of the block buffer 20 and color map memory 28 in the microprocessor's memory organization. The select signals enable the exchange of data between the respective block buffer 20 or color map memory 28 and the microprocessor 21. The microprocessor selects the direction of the data exchange by generating a read-write R/$\overline{W}$. Data is read out of the block buffer and placed on the microprocessor's data bus when the R/$\overline{W}$ signal is a logical high and when the BLOCK BUFFER SELECT signal is high. An AND gate 31 denotes the required logical function and enables a tristate driver 32 to place the data read from the lock buffer 20 onto the microprocessor's data bus.

Figure 16B:
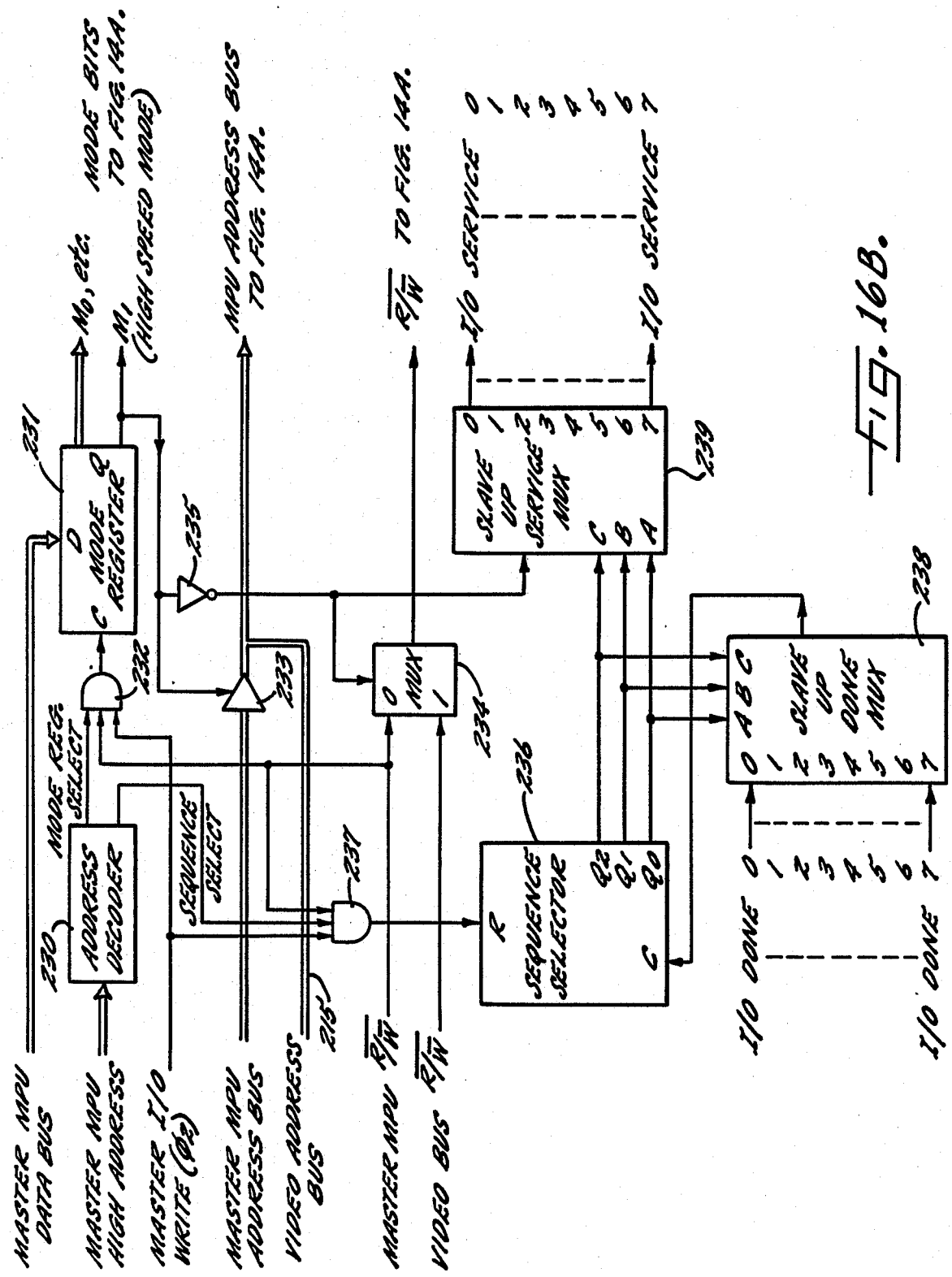
FIG. 16B is a schematic diagram of priority decision circuits for preventing bus contentions and allocating video bus access among a plurality of slave microprocessor circuits as shown in FIG. 16A.

To write data from the microprocessor 21 into the block buffer 20 or color map memory 28, an additional signal supplied by the microprocessor is required to precisely specify the time when the data and addresses have been properly set by the microprocessor. Otherwise, the wrong data could be written to the wrong addresses in the block buffer 20 or color map memory 28. For this purpose a signal $\phi_2$ is available having a rising edge specifying the required instant in time for "writing". For the embodiment in FIG. 5, the microprocessor 21 and decoder 27 alternately access the block buffer 20, and thus the signal $\phi_2$ is the second phase of the microprocessor's clock so that memory access by the microprocessor will be periodic and synchronized with the operation of the decoder 27. (This synchronization requirement may be eliminated using asynchronous interface circuits such as are shown in FIGS. 16A and 16B, described below.) An AND gate 33 applies the $\phi_2$ signal to the block buffer 20 only when the block buffer is selected for a write operation. Similarly, an AND gate 34 applies the $\phi_2$ signal to the color map memory 28 only when the color map memory is selected for a write operation.

The register organization of the block buffer 20 and its 64-bits-per-block-buffer-word size prevents the microprocessor 21 from accessing an entire 64-bit word during a single microprocessor memory cycle. Thus a register selector 35 is provided for exchanging data with only a designated one of the eight block buffer registers during a single memory cycle. The register selector 35 accepts the three least significant address bits $A_2$, $A_1$, $A_0$ from the microprocessor's address bus in order to designate the desired register. Because of the large number of bits in the block buffer word, each bit typically being stored in a different respective memory integrated circuit, a data buffer 36 is shown for applying the data to all of the memory integrated circuits.

Figure 7:
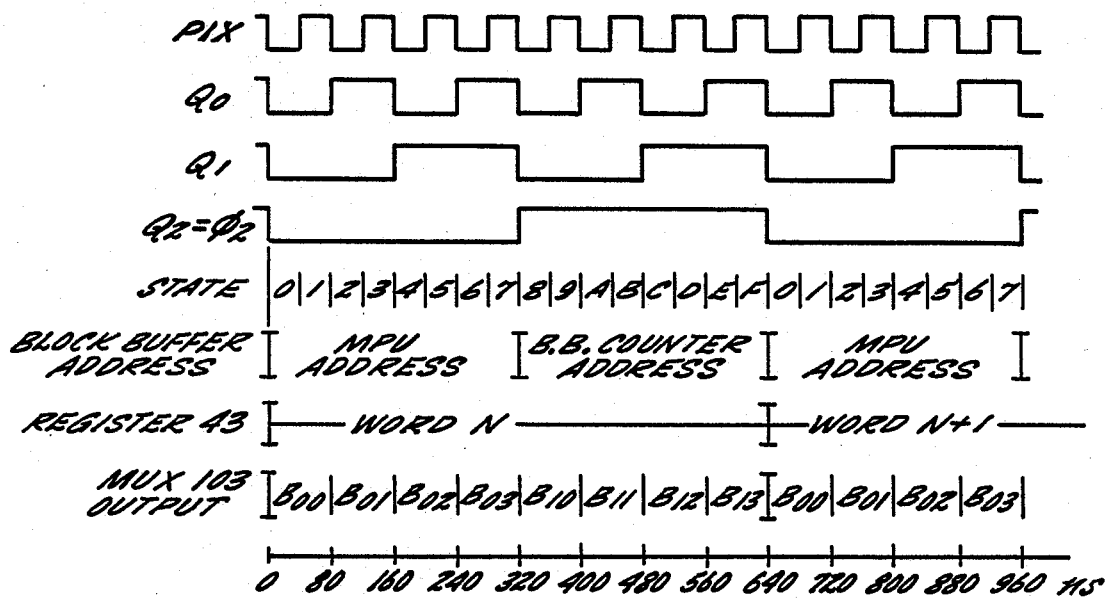
FIG. 7 is a timing diagram illustrating the operation of certain portions of the system illustrated in FIGS. 5 and 6.

The timing for the video game system is established by a crystal-controlled high frequency time base generator 40 which drives the raster scan generator 25 in synchronism with a pixel clock PIX. The pixel clock PIX specifies the time duration for the display of each pixel on the color monitor 24. Since the decoding process is periodic over a cycle of eight pixels, the block buffer control logic 26 counts the pixel clock cycles in binary to generate three binary outputs $Q_0$, $Q_1$, $Q_2$ which control the decoder 27 and the access of the block buffer 20 by the decoder 27, as shown in FIG. 7. The binary state $Q_2$ is also synchronized to the microprocessor's $\phi_2$ clock so that the microprocessor 21 and the decoder 27 alternately have access to the block buffer 20.

The block buffer video address at which the decoder 27 accesses the block buffer 20 is a rather complex function of $Q_2$, $Q_2$ being the rate at which the block buffer video address must change and at which 64-bit words of block buffer data are read by the decoder 27. The block buffer video address must be periodic at the frame scanning rate specified by the raster scan generator and also must respond to the horizontal and vertical scanning rates to account for the fact that each encoded block of pixels must be addressed by the decoder for different horizontal scan lines and different vertical intervals per frame. A block buffer address counter 41 performs the required logic to generate the current block buffer video address and also to generate ROW1 and ROW0 binary signals that are a function of the current vertical interval per frame and horizontal line per pixel block. Each pixel block comprises pixels for four different horizontal lines, specified by ROW1 and ROW0.

Since the block buffer 20 is alternately accessed by the microprocessor 21 and the decoder 27, a block buffer address multiplexer 42 selects either the low address bits $A_3$–$A_x$ (x depending on the size of the block buffer) or the block buffer video address from the block buffer address counter 41 to be used as the block buffer address. The three least significant low address bits $A_0$, $A_1$, $A_2$ are omitted since they specify the particular register selected by the register selector 35. The multiplexer 42 is controlled by $Q_2$ so that the microprocessor read or write occurs just before the block buffer video address is selected. The read operation for the decoder 27 is performed by a set of eight 8-bit registers 43 on the falling edge of $Q_2$ just before the microprocessor address is selected. An inverter 44 supplies the required polarity of $Q_2$.

In contrast to the block buffer 20, the color map memory 28 operates eight times faster (at the pixel rate) to designate the color for each pixel on a real time basis. Thus, access to the color map memory 28 cannot be alternated with the microprocessor 21 on a synchronous basis. Rather, the microprocessor 21 may take over access to the color map memory 28 at any time, as signalled by the COLOR MAP SELECT signal. A color map memory address multiplexer 45 selects the addresses specified by the decoder 27 unless the color map memory 28 is selected by the microprocessor 21. Typically the microprocessor 21 waits for vertical retrace to access the color map memory 28 so that the decoding process will not be disturbed when pixels are being displayed by the color monitor 24.

Figure 6:
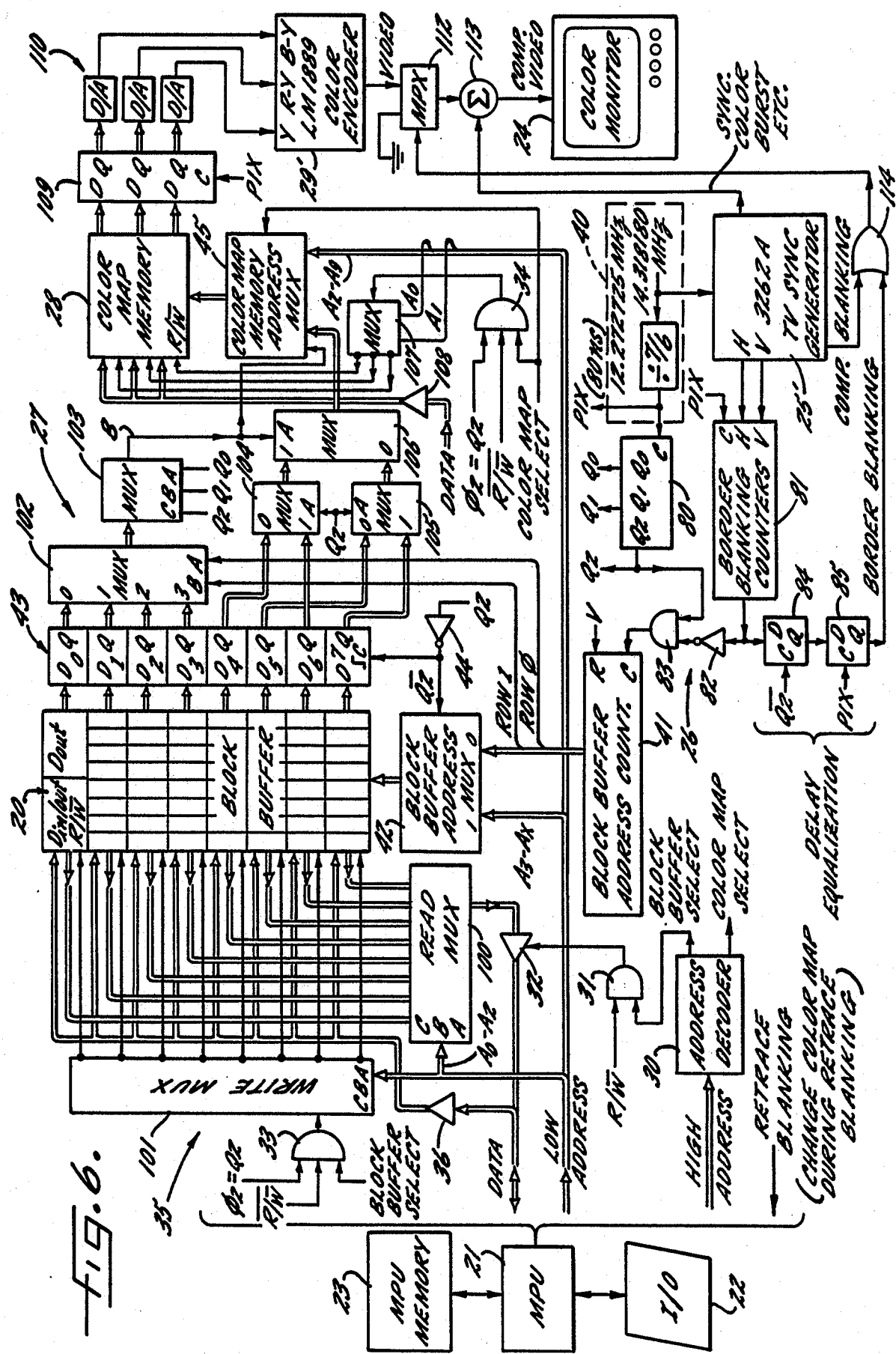
FIG. 6 is a still more detailed block diagram of the system illustrated in FIG. 4.

FIG. 6 is a more detailed functional block diagram of the simple video game system as outlined in FIG. 5. Of particular importance in this system is the block buffer control logic 26, which generally specifies the operations to be performed during the time that a given pixel is displayed by the color monitor 24. To supply a clock signal at the pixel frequency to the block buffer control logic 26, a crystal oscillator in the time base generator 40 produces a 14.318180 MHz output which is divided down to generate a pixel clock PIX. This same oscillator provides a clock input to the raster scan generator 25 in the form of a TV sync generator integrated circuit 25', e.g., a type 3262A TV sync generator. To produce the desired pixel clock, the oscillator output is divided by seven and multiplied by six to generate an 80-nanosecond pixel clock PIX for a reasonably high resolution of 640 pixels per horizontal line at the conventional television scanning rate.

Because of the standard 3 to 4 aspect ratio (height to width relationship) of television displays, a pixel rate of about 80 nanoseconds is required to display pixels that are equally spaced horizontally and vertically in an NTSC television raster display. This pixel rate is approximately the rate calculated assuming the conventional 63.5 microseconds per horizontal scan line and 525 horizontal lines per frame as:

$$\frac{3 \text{ horiz. lines/frame}}{4 \text{ pixels/horiz. line}} \times \frac{1 \text{ frame}}{480 \text{ active horiz. lines}} \times$$

(51 microseconds/active horiz. line) = 80 ns/pixel

By using 64K dynamic memories with cycle times of 320 nanoseconds, two different input/output operations can be carried out in the time required to update the video display (8 pixels ×80 ns.=640 ns.). Indeed, by using dynamic RAMs with faster cycle times, even more input/output operations may be interleaved; for example, by using dynamic RAMs capable of cycle times of 213 ns., three different operations may be interleaved.

Figure 8:
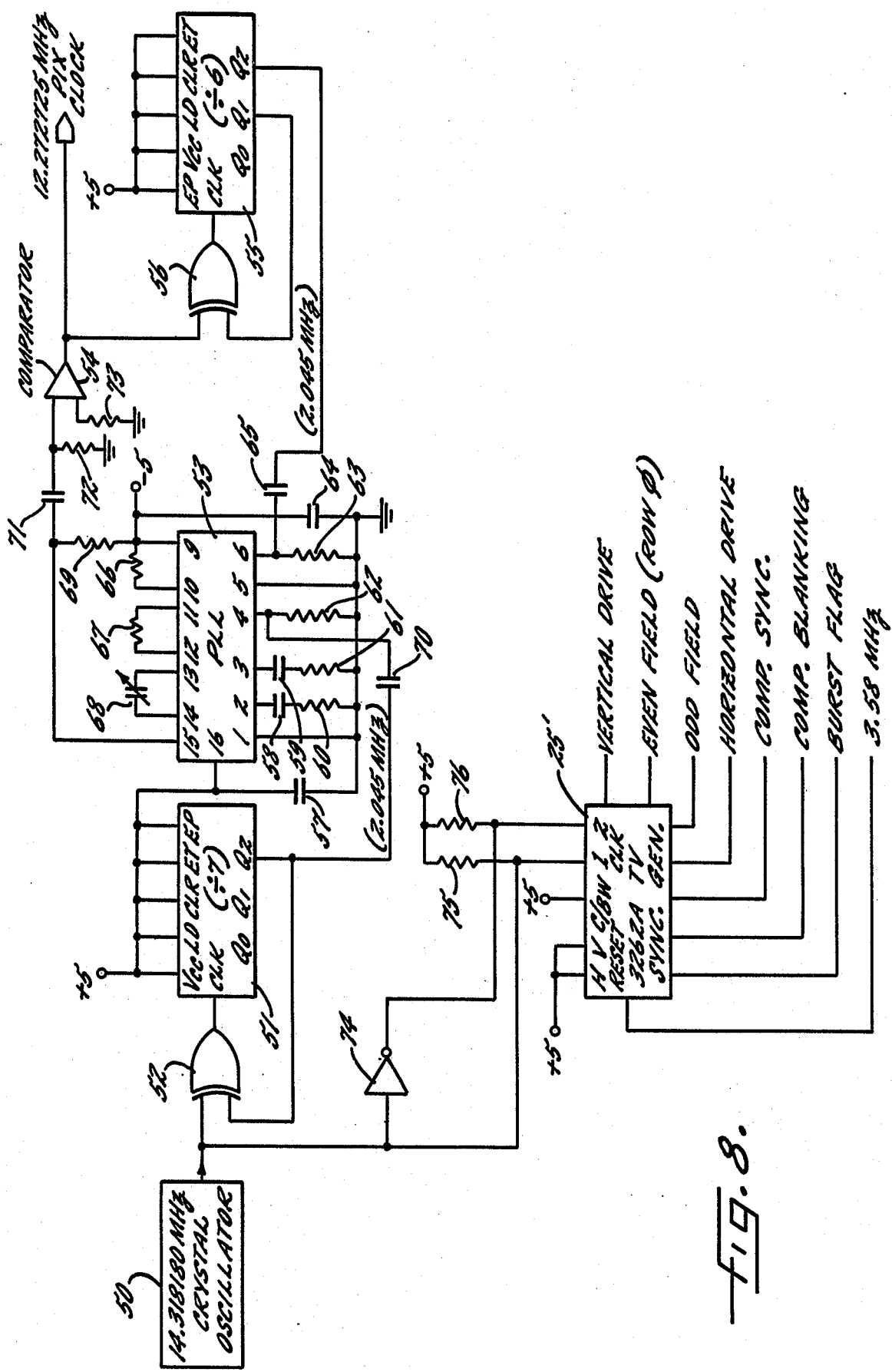
FIG. 8 is a schematic diagram of the high frequency time base circuits designated 40 in FIG. 5.

The high frequency time base circuits generally designated 40 in FIG. 6 are shown in more detail in FIG. 8. Thus, a crystal oscillator 50 provides a stable time base at 14.318180 MHz for driving the sync generator 25' and producing the pixel clock PIX. A binary counter 51 (e.g., a 74S163 IC) clocked at the 14.318180 MHz rate feeds back its third binary output Q2 to a clock-gating exclusive-OR gate 52. Thus, the counter 51 divides by 7 on output Q2, one factor less than if the exclusive-OR gate were not present. The resulting 2.045 MHz signal is applied to one of the two phase detector inputs of a high frequency phase-locked loop 53 (e.g., an XR-215 IC) having a 12.3 MHz center frequency. A comparator 54 (e.g., a 710) generates a fast binary logic signal from the output of the phase-locked loop 53. A second binary counter 55 (e.g., a 74S163 IC) receives the 12.3 MHz signal from the comparator, and has its second binary output $Q_1$ fed back to a clock-gating exclusive-OR gate 56 so that the counter divides by 3 on its output $Q_1$. The phase-lock loop has a tendency to lock or generate an output frequency so that the signals on its two phase detector inputs have exactly the same frequency. Thus a divide-by-6 output appears on the third binary output $Q_2$, which is applied to the second phase detector input of the phase-locked loop 53. Hence, the output PIX of the phase-locked loop becomes 12.272725 MHz, exactly 6/7 ths of the frequency of the crystal oscillator 30a.

The phase-locked loop 53 has associated components with particular component values to select the 12.3 MHz center frequency and to assure proper phase locking. The component values are as follows: 0.1 microfarads for capacitor 57, 0.001 microfarads for capacitors 58 and 59, 560 ohms for resistors 60 and 61, 1K ohms for resistors 62 and 63, 0.1 microfarad for capacitor 64, 0.01 microfarad for capacitor 65, 1K ohms for resistor 66, 5.1K ohms for resistor 67, 18 picofarads for adjustable capacitor 68 (trim for 12.28 MHz center frequency), 10K ohms for resistor 69, 0.01 microfarads for capacitor 70, 0.01 microfarad for capacitor 71, and 1K ohms for resistors 72 and 73.

FIG. 8 also shows the TV sync generator IC 25' part No. 3262A, driven at the 14.318180 MHz rate of the crystal oscillator 50. An inverter 74 (e.g., a 74S04) supplies an inverted clock phase to the sync generator IC 25, and pull-up resistors 75, 76 (1K ohms) are also used on the clock inputs to the sync generator 25'.

Returning to FIG. 6, since there are eight pixels generated by each block buffer address word in each horizontal scan, a divide-by-eight binary counter 80 generates the decoded binary outputs $Q_0$, $Q_1$, and $Q_2$ for coordinating the decoding functions of the decoder 27. That is, the three output signals $Q_0$, $Q_1$ and $Q_2$ represent a three-digit binary number that steps repeatedly through a count of 0 to 7 in synchronism with the clock signal PIX. The function of these signals $Q_0$–$Q_2$ can be understood more clearly by reference to the timing diagram of FIG. 7. The most significant binary output $Q_2$ is periodic at the 640-nanosecond rate (e.g., 8 times the PIX rate) and is used as the memory access clock $\phi_2$ for reading out successive 64-bit words from the block buffer memory 20. This relatively slow 640-nanosecond rate is made possible by the rather large 64-bit size of the block buffer words and permits the use of inexpensive 64K dynamic RAM memory chips for the block buffer 20, even though the block buffer is alternately time shared between the microprocessor 21 and the decoder circuit 27. In other words, the block buffer 20 is operated at a 320-nanosecond rate as it is alternately accessed by the microprocessor 21 and the decoder 27, as illustrated by the timing diagram in FIG. 7.

As is conventional in video display systems, the pixel clock PIX and the horizontal and vertical synchronization pulses H, V from the sync generator 25 are fed to border blanking counters 81 (FIG. 6) in order to generate a BORDER BLANKING signal for producing an inactive region around the picture to be displayed on the color monitor 24. This ensures that every pixel encoded in the block buffer memory 20 is displayed on the color monitor 24 even if the center of the displayed picture is offset or if the vertical or horizontal size of the picture varies due to drift in the color monitor circuits. If border blanking were not used, part of the encoded picture could be lost by falling outside the face of the cathode ray tube of the color monitor. Alternatively, the border blanking function may be programmable, as described below in conjunction with FIG. 11.

In the illustrative system, the BORDER BLANKING signal from the counters 81 is used to gate the application of the signal $Q_2$ to the block buffer address counter 41, and an inverter 82 and AND gate 83 are shown for this purpose. The block buffer address counter 41 generates the block buffer addresses needed to read out the block buffer data words in the desired order of appearance of the corresponding pixels in the video display to be generated therefrom. It should be noted that the pixel specified by the TV sync generator 25 and generated on the color monitor 24 is not actually the pixel being addressed in the block buffer 20 and decoder circuits 27 at any given instant, since there is a delay associated with the addressing and reading of the block buffer memory 20 and the decoding operation performed by the decoder 27 and color map memory 28. Because of this delay, the pixel actually being generated on the color monitor 24 at a given instant is the pixel preceding the pixel being addressed by the block buffer address counter 41 and decoder circuits 27 at that instant.

Since there is a delay associated with the decoding of a particular pixel, a corresponding delay is applied to the border blanking signal from the counters 81 so that pixels at the right-hand boundary of the border on the color monitor 24 are not blanked. For this purpose delay equalization D flip-flops 84, 85 are used to delay the border blanking signal by respective delay intervals of 320 nanoseconds, corresponding to the delay of the block buffer memory 20, and 80 nanoseconds, corresponding to the delay of the decoder 27 and color map memory 28. To achieve these desired delay intervals, the signals $Q_2$ and PIX are applied to the respective flip-flops 84 and 85.

The block buffer address counter 41 is reset by each vertical synchronization pulse V from the sync generator 25', and thereafter counts out the block buffer addresses corresponding to the pixel blocks 11' that are to be serially displayed by the raster scanning of the color monitor 24. In general, the block buffer address counter 41 increments by one count every eight pixels i.e., every eight cycles of the pixel clock PIX. But the block buffer address counter 41 counts through the addresses of the block buffer words for each row of pixel blocks 11' twice before moving on to the addresses of the block buffer words for the next row of pixel blocks 11'. Although there are four rows of pixel bits B in each 64-bit block buffer data word, only the first and third rows of pixels in each pixel block 11' are scanned for odd fields of the video display, and only the second and fourth rows for even fields, due to the conventional interlaced scanning technique of standard television. That is, all the odd lines from the top of the screen to the bottom are scanned first, and then the beam is returned to the top of screen and all the even lines from the top to the bottom of the raster are scanned. The process of weaving the odd and even lines together to form a raster is referred to as interlacing.

Figure 9:
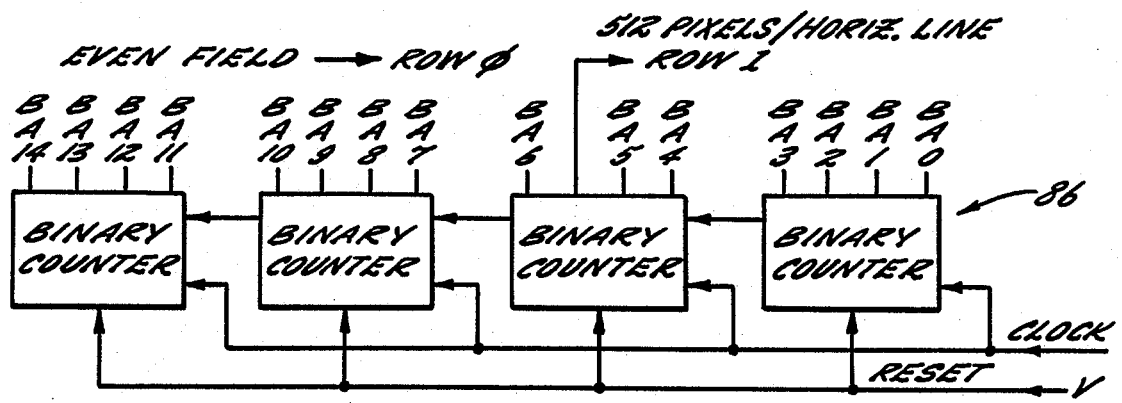
FIG. 9 is a schematic diagram of one form of a block buffer address counter for use in the system of FIG. 5.

If the number of pixels per horizontal line is a power of two, a simple binary counter chain 86 as shown in FIG. 9 may be used to implement the block buffer address counter 41. For example, if there are 512 ($2^9$) pixels per horizontal line, there are 128 pixel blocks per line, or 64 block buffer words. The double horizontal scanning of the block buffer addresses (in both the odd field and the even field) is achieved by skipping the seventh binary output in the assignment of block buffer address select lines $BA_0$–$BA_{14}$. This skipped binary output designated ROW1—which goes high each time the counter initially reaches a count of 64—is used to indicate to the decoder 27 (FIG. 6) whether horizontal scanning is to proceed over the upper two pixel rows (ROW1=0) or the lower two pixel rows (ROW1=1) for each pixel block 11'. In other words, the decoder 27 operates upon the first or second register 0 or 1 if ROW1 is a logical zero, and upon the third or fourth register 2 or 3 if ROW1 is a logical one.

To determine exactly which pixel row is being accessed, the "even field" signal from the raster scan generator 25 specifies the ROW0 pointer indicating whether the first and third or second and fourth pixel rows in each block 11' are being accessed. In other words, the concatenation of ROW1 and ROW0 specify the binary numbers for the desired sequence of pixel rows in each pixel block 11' and the corresponding 8-bit registers which receive the data bits B from those pixel rows. The hardware for accomplishing this pixel row selection will be described below.

Although the counter chain 86 may be reset to zero each time an odd-field or even-field scan is completed, parallel-load counters can provide more versatility because they can be set to any desired buffer starting location provided on their parallel inputs. Multiple fields of encoded video data may be stored in the block buffer 20, and the microprocessor 21 may select a desired field for display by loading the parallel-load counter with the starting address of the desired field. For even greater versatility, the parallel-load counter may be loaded with any desired starting address per row of pixel blocks. Typically, the predetermined starting addresses increase from one row to the next by the number of pairs of pixel blocks per horizontal line, or by 80 for 640 pixels per horizontal line. But the starting addresses may be repetitive to display the same row of pixel blocks any number of times; this technique minimizes the data required to be encoded for those portions of an image that have two or more identical lines of pixels, such as a blue sky portion of a background scene, for example. Also, the starting addresses of consecutive rows may be spaced substantially further apart than the number of pairs of pixel blocks per horizontal line so that only a portion or "window" of the image coded in the block buffer is displayed. In fact, the starting addresses may be changed by the microprocessor 21 in order to dynamically alter the background scene of a video game in a widespread fashion. This is desirable, for example, to scroll the entire background field up or down by scrolling the starting addresses of the rows of pixel blocks, or to pan the background display to the right or left by incrementing or decrementing the starting addresses of the horizontal lines.

Figure 10:
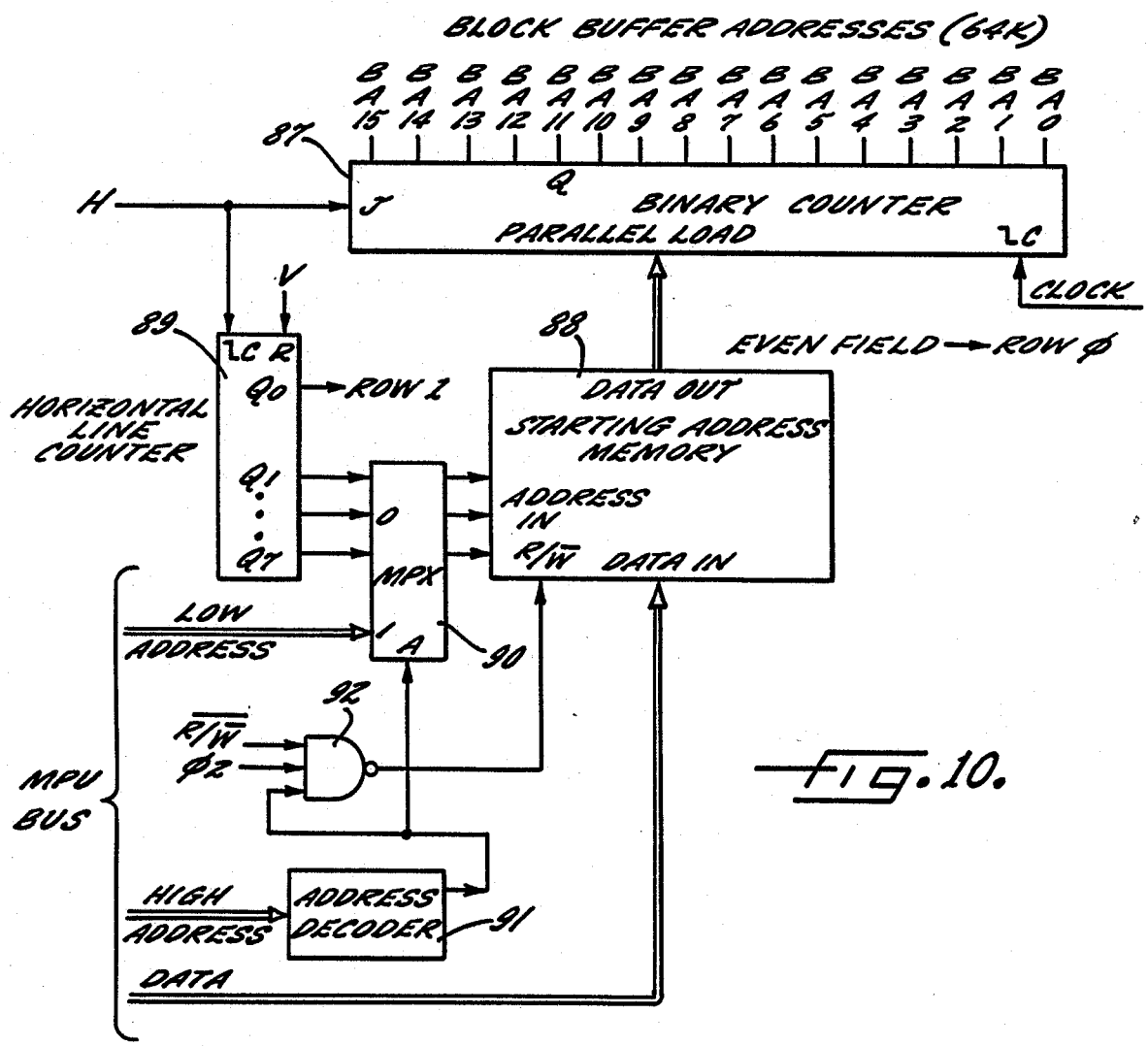
FIG. 10 is a schematic diagram of a modified form of block buffer address counter for use in the system of FIG. 5.

One example of a block buffer address counter that has the ability to change starting addresses is shown in FIG. 10. In this arrangement a 16-bit, parallel-load binary counter 87 generates addresses for a 64K-word block buffer memory 20. With its 16-bit output, the counter 87 can generate 64K different binary numbers as addresses for the 64K block buffer memory words. This memory size permits the use of 64K-bit memory chips which are commercially available and which provide for the storage of at least six different video frames in the block buffer memory 20.

Since all the outputs of the parallel binary counter 87 are used to specify block buffer addresses, the starting address for each row of block buffer words must be specified coincident with the horizontal drive pulse H. For this purpose, a starting address memory 88 is addressed by a horizontal line counter 89 clocked by the pulse H and reset by the vertical drive pulse V. In practice, the starting address memory 88 comprises four 1K×4 memories. The starting address memory 88 is random access memory accessible by the microprocessor 21 through an address multiplexer 90 and input data lines from the microprocessor data bus. An address decoder 91 generates the multiplexer 90 control signal for selecting the microprocessor address bus. The read-write signal for the starting address memory is obtained in the usual manner using NAND gate 92. The microprocessor can access the starting address memory 88 during the vertical retrace interval at a block of microprocessor addresses programmed in an address decoder 91. In the case of 640 pixels per line, or 80 block buffer words per line, the addresses stored in the starting address memory are, for example, 0, 0, 80, 80, 160, 160, 240, 240, etc.

Figure 11:
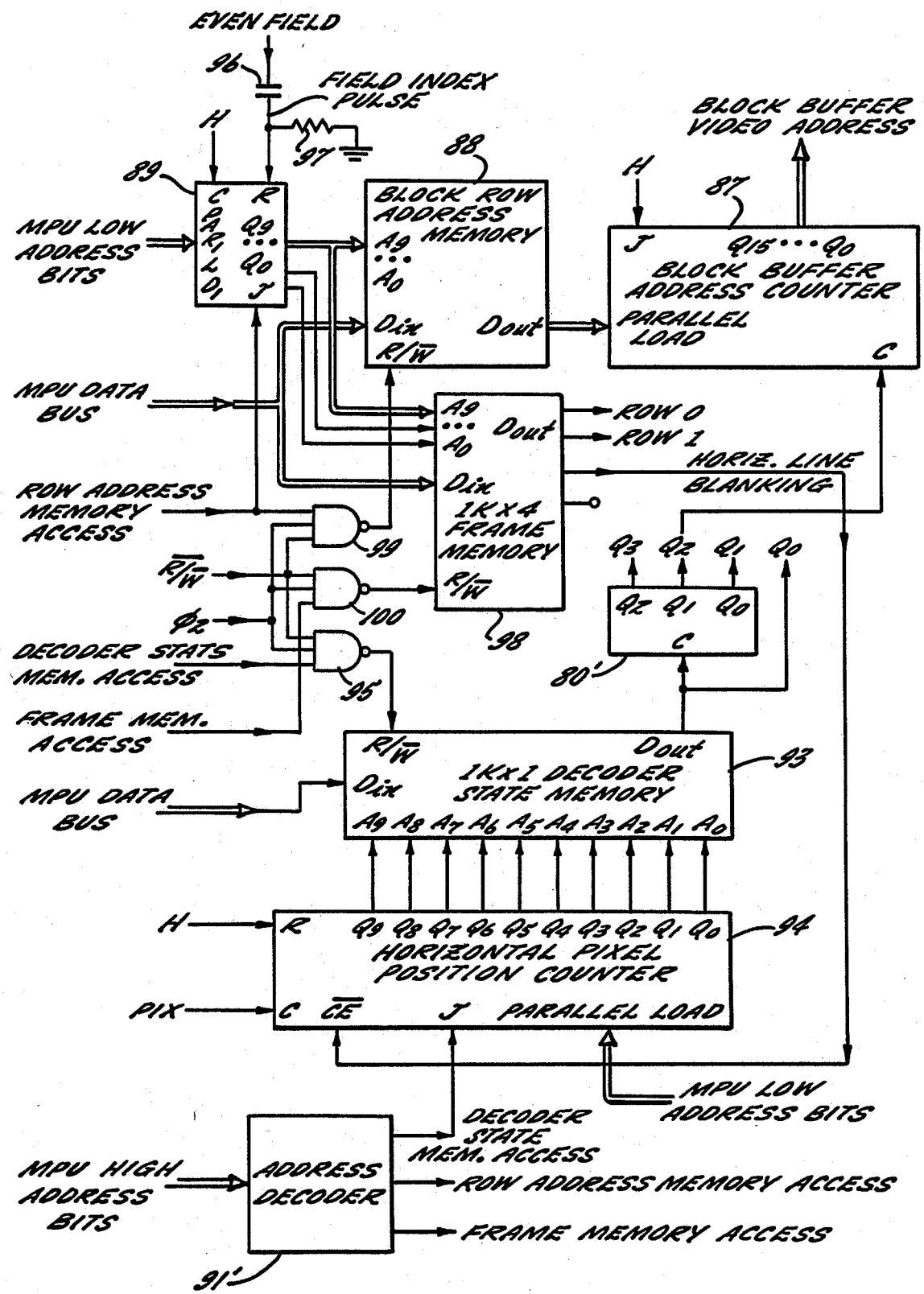
FIG. 11 is a schematic diagram of a programmable block buffer address counter and programmable pixel clock generator.

A fully-programmable embodiment for the block buffer control logic 26 and block buffer address counter 41 is shown in FIG. 11. The least significant binary state control signal $Q_0$ is generated in a fully programmable fashion as a function of horizontal scan line pixel position by means of a single bit decoder state memory 93. The address for the decoder state memory 93 is supplied by a horizontal pixel position counter 94 clocked by the pixel clock PIX. The desired binary waveform for $Q_0$ is programmed in the decoder state memory 93 by loading the ten low microprocessor address bits into the pixel counter 94 when an address decoder 94' is enabled. The write pulse to the memory is supplied by a NAND gate 95. The single bit output of the memory 93 generates $Q_0$, while a binary counter 80' derives $Q_1$, $Q_2$ etc. from $Q_0$. The decoder state memory is programmed with other than a 0, 1, 0, 1, binary sequence to stretch pixels in the horizontal direction. A pixel will be stretched by a binary digit repeating in the programmed sequence, since then the decoder state specified by ($Q_2$, $Q_1$, $Q_0$) will not change. The horizontal stretching is useful in the generation of vertical stripes such as the left and right borders on the display, and in the expansion of a displayed image.

In order to provide programmable control of the ROW0 and ROW1 inputs to the decoder 27, the horizontal line counter 89 is reset by a field index pulse instead of the vertical reset pulse V. The field index pulse occurs half as fast as the vertical reset pulse for interlaced raster scanning. If the sync generator IC 25' (FIG. 8) does not generate a field index pulse, such a pulse can be derived from the "even field" signal by a differentiating capacitor 96 and resistor 97. The ROW0 and ROW1 signals are then programmed in a 1K×4 frame memory 98 as a function of horizontal scan line number for the entire frame comprising both the odd and even field. A third output of the frame memory supplies a programmable horizontal line blanking signal applied to the clock enable input CE of the pixel position counter in order to generate the top and bottom picture borders as operation of the block buffer address counter 87 and decoder 27 are suspended when the pixel position counter is inhibited by the border blanking signal. A NAND gate 99 generates the write pulse active to program the frame memory 98.

Turning back to FIG. 6, the register selector 35 is comprised of a read multiplexer 100 and a write multiplexer 101. When the microprocessor 21 accesses the block buffer memory 20, it accesses only a particular one of the 8-bit subsets of one of the 64-bit units. The particular byte accessed is selected by either the read multiplexer 100 or the write multiplexer 101 according to the values of the three low order address bits $A_0$–$A_2$ applied to the control lines A, B and C of the multiplexers 100 and 101.

To perform the decoding function, the block buffer memory 20 is addressed by the block buffer address counter 41 every 640 nanoseconds, and all eight bytes of the addressed word are strobed into the eight 8-bit registers 43, identified as registers 0–7 in FIG. 6. The decoder 27 further comprises a set of multiplexers 102–106 for decoding the data in the registers 43 and generating a series of color map memory addresses. The particular 8-bit register 43 corresponding to the horizontal line of pixel bits being scanned is selected by a multiplexer 102 having control inputs accepting the ROW1 and ROW0 signals from the block buffer address counter 41. It will be recalled that the value of ROW1 designates either registers 0 and 1 or 2 and 3, while the value of ROW0 designates either even-field registers 0 and 2 or odd-field registers 1 and 3; thus the combination of these two signals always designates only one of the first four registers 0–3.

Individual pixel bits B are shifted out of the selected register 0, 1, 2 or 3 by a multiplexer 103 in response to each set of eight successive binary numbers represented by the signals $Q_0$, $Q_1$ and $Q_2$ from the decoder state counter 80. The high and low color map memory addresses for the current pixel block 11' are selected by multiplexers 104 and 105, respectively. More specifically, the multiplexer 104 receives the two "high" color map addresses $H_0$–$H_7$ contained in each 64-bit word, and the multiplexer 105 receives the two "low" color map addresses $L_0$–$L_7$. Both multiplexers 104 and 105 also receive the signal $Q_2$, the level of which indicates whether the system is scanning the first four bits (for the first block) or the second four bits (for the second block) in any given row, thereby enabling the multiplexers to pass the proper high and low addresses to the multiplexer 106. Either the high or low color map memory address is selected by the multiplexer 106 in accordance with the logical value of the current pixel bit B as received from the multiplexer 103. The color map memory address multiplexer 45 then applies the selected high or low address to the color map memory 28, unless the microprocessor 21 itself is updating the color map memory. The pixel bit B is also used as one color map address bit, so that there is in effect a separate color map for high and low pixel bits. As noted above, this effectively doubles the color resolution for registers of small color gradation and thus helps suppress contour effects.

The color map memory 28 is shown as three separate 8-bit memory components containing binary numbers for the Y, R-Y, and B-Y NTSC color components for a preselected color in each addressable location. A write multiplexer 107 applies the write pulse from the AND gate 34 to the particular memory section specified by the lower two address bits $A_0$, $A_1$ whenever the microprocessor 21 selects the color map memory, via the address decoder 30. A buffer 108 applies the microprocessor data to the inputs of the color map memory components 28. A read multiplexer, AND gate and tristate driver (similar to 100, 31, 32) could also be added to permit the microprocessor 21 to read the color map memory 28.

In order to generate a composite video signal for driving the color monitor 24, the three binary numbers from the addressed location of the color map memory 28 are strobed into a latch 109 by the signal PIX, converted to analog values by three fast digital-to-analog converters 110, and fed to a conventional NTSC color encoder circuit 29' (e.g., a LM 1889 integrated circuit) which modulates the R-Y and B-Y chroma signals in quadrature by a color carrier to form a standard color video signal. The video signal is further blanked by an analog switch 112 and sync is added by a summing network 113 in the conventional manner to generate the composite video for driving the color monitor 24. (This summing network also in add is a color burst and establishes the proper "pedestal level" for the video signal). The blanking signal is the logical sum of the border blanking and the composite blanking signal from the TV sync generator 25', as summed by an OR gate 114. Instead of using an analog switch 112 to gate the video signal, the blanking signal from the OR gate 114 could alternatively gate the reference voltage to the fast digital-to-analog converters.

The system of FIG. 6 has been described thus far as having a color map memory which stores three separate bytes specifying eight bits (256 levels) for each of the Y, R-Y and B-Y NTSC color components. Generally speaking, the Y signal specifies the brightness or intensity of the displayed color, while the R-Y and B-Y signals specify the hue of the color and are approximately the difference between the intensity of the red or blue primary color component, respectively, and the total color intensity Y. This is a total of 24 bits per color. It should be noted, however, that the R-Y and B-Y signals contain less information and may be represented with less precision than the luminance signal Y because of the inefficiency of the NTSC encoding system and because the human visual system is less responsive to gradients in hue than to gradients in luminance. Consequently, for certain applications such as home video games it may be desirable to have a color map memory with only 16 bits per color, and to subdivide these 16 bits into unequal numbers of bits to represent the Y, R-Y, and B-Y color components. One such allocation scheme is to use seven of the 16 bits for the luminance Y, five bits for the chrominance R-Y, and four bits for the chrominance B-Y.

It is possible to assign eight bits to the luminance Y without significantly restricting the range of hue if the color encoding process removes the correlation or redundancy between the luminance Y and the chroma signals R-Y and B-Y. This redundancy is normally present whenever the chrominance levels R-Y and B-Y are encoded separately and independently of the luminance Y. To remove this redundancy, the 16 bits from the color map 28 can be transformed to generate an increased number of bits which independently and uniformly represent the full range of colors perceived by the observer. It should be noted that eight bits of luminance Y give 256 luminance levels which fairly accurately and uniformly cover the range of perceived luminance. (It is assumed that the encoder or the Y digital-to-analog converter performs a "gamma" correction to compensate for the non-linear response of the typical cathode ray tube.) But the chrominance signals R-Y and B-Y do not uniformly indicate different hues because the perceived effect is highly dependent upon the particular luminance level.

Figure 12:
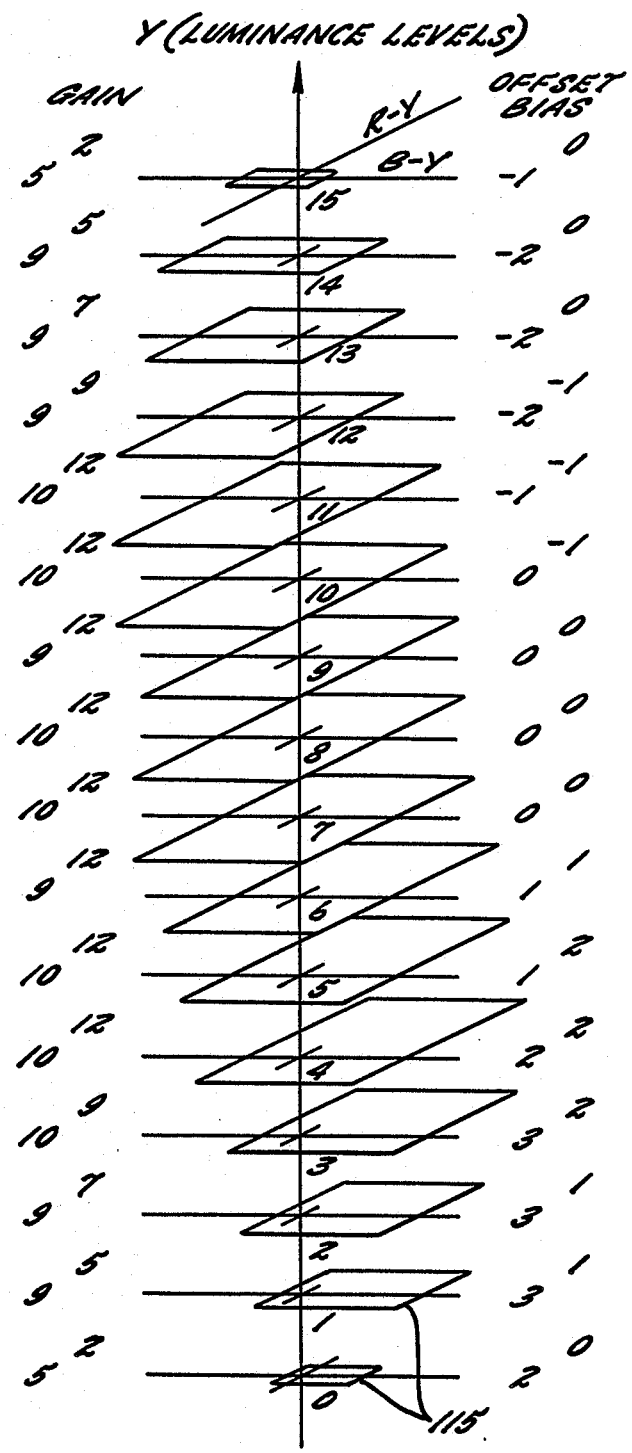
FIG. 12 is a diagrammatic illustration of the relative range of chrominance signals R-Y and B-Y generally corresponding to the range of hue perceived by a human observer.

The relative range of chrominance signals R-Y and B-Y generally corresponding to the range of hue perceived by the human observer is illustrated in FIG. 12. For simplicity the regions representing the range of perceived hue are approximated by rectangular regions 115. For high luminance levels, such as the maximum level 15 in FIG. 12, the range of chrominance signals is rather limited since the primary colors R, B, and G are all at approximately their maximum values to obtain the maximum intensity from the video display. Similarly, at low luminance levels, the chrominance space is also restricted corresponding to the decreased sensitivity of the human observer to hue at low luminance. In general, areas in the color space of FIG. 12 outside the rectangular regions represent colors which cannot be transmitted through the NTSC television system and perceived by the observer as colors distinct from those colors within the rectangular regions 115. Thus, one disadvantage to using the NTSC coding system is that, in the absence of some kind of compression and expansion of the R-Y and B-Y values, well over half of the levels for R-Y and B-Y are wasted.

Accordingly, the R-Y and B-Y levels stored in the color map memory are preferably transformed to the regions of permissible NTSC codes. The most simple such transformation is a linear transformation of the R-Y and B-Y signals independently, thereby mapping all possible codes into the rectangular regions 115 of FIG. 12. The gain or multiplication factor for the linear transformation is dependent on the respective width or length of the rectangular region, while the offset or bias of the transformation corresponds to the offsets of the rectangular regions from the (R-Y)=0, (B-Y)=0, axis.

Figure 13:
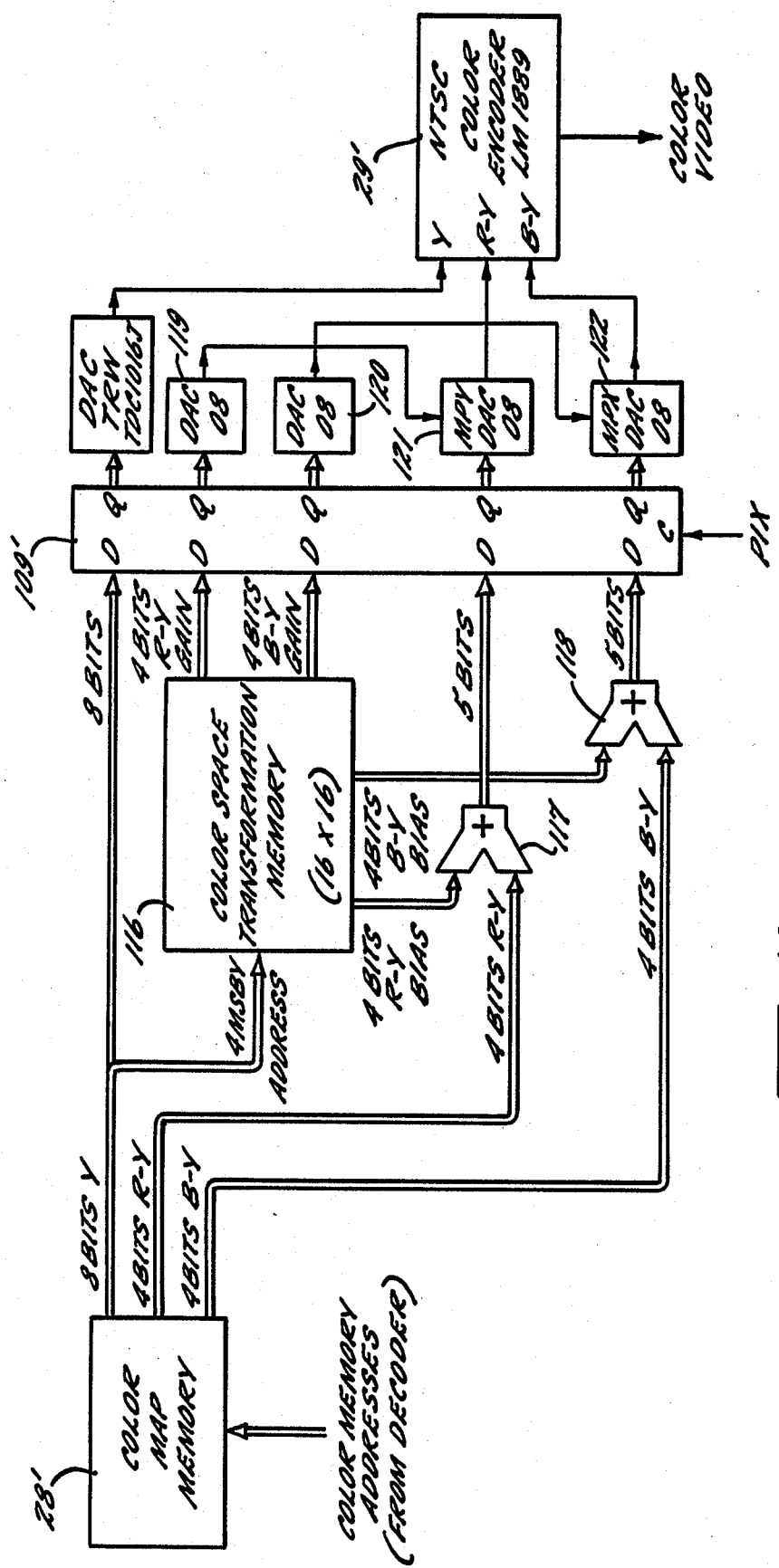
FIG. 13 is a block diagram of a transformation system for use in conjunction with the system of FIG. 5.

Hardware for performing the linear transformation of FIG. 12 is shown in FIG. 13. The color map memory 28' in FIG. 13 is organized in terms of two 8-bit bytes forming a 16-bit color word. The first byte specifies eight bits or 256 luminance Y values. The second byte comprises four bits of R-Y chrominance and four bits of B-Y chrominance. The four most significant Y bits are used as addresses for a color space transformation memory 116 comprising sixteen 16-bit words. The first four bits of a color space transformation word specify the R-Y bias or offset which is added to the four bits of R-Y encoded chrominance to generate a five-bit sum. Similarly, the second four bits of the color space transformation word specify the B-Y bias which is added to the four bits of B-Y. The third four bits of the color space transformation word provide a multiplicative gain for scaling the B-Y values, and the last four bits specify a similar R-Y gain.

A latch 109' strobed by the pixel clock PIX equalizes the delays of the color map memory 28', the color space transformation memory 116, and the adders 117 and 118. The R-Y gain and B-Y gain are fed to respective digital-to-analog converters 119 and 120 to generate analog signals used as references for multiplying digital-to-analog converters 121 and 122 which receive the five-bit R-Y sum and the five-bit B-Y sum, respectively. Hence, the outputs of the multiplying digital-to-analog converters 121, 122 are the transformed R-Y and B-Y analog signals. The eight bits of luminance Y are fed to a high speed 8-bit digital-to-analog converter 123, e.g., a TRW TDC1016J, which generates the analog luminance signal Y. These analog signals are then fed to the NTSC color encoder 29' to generate the color video signal.

It should be noted that even more complex coding could be used to uniformly populate the regions of allowable color in the NTSC color space of FIG. 12. The optimum case, for example, would require a 64K×24-bit color space transformation memory to store each of the equally dispersed 64K color values that could be indicated by the 16-bit color map memory words.

Figure 14A:
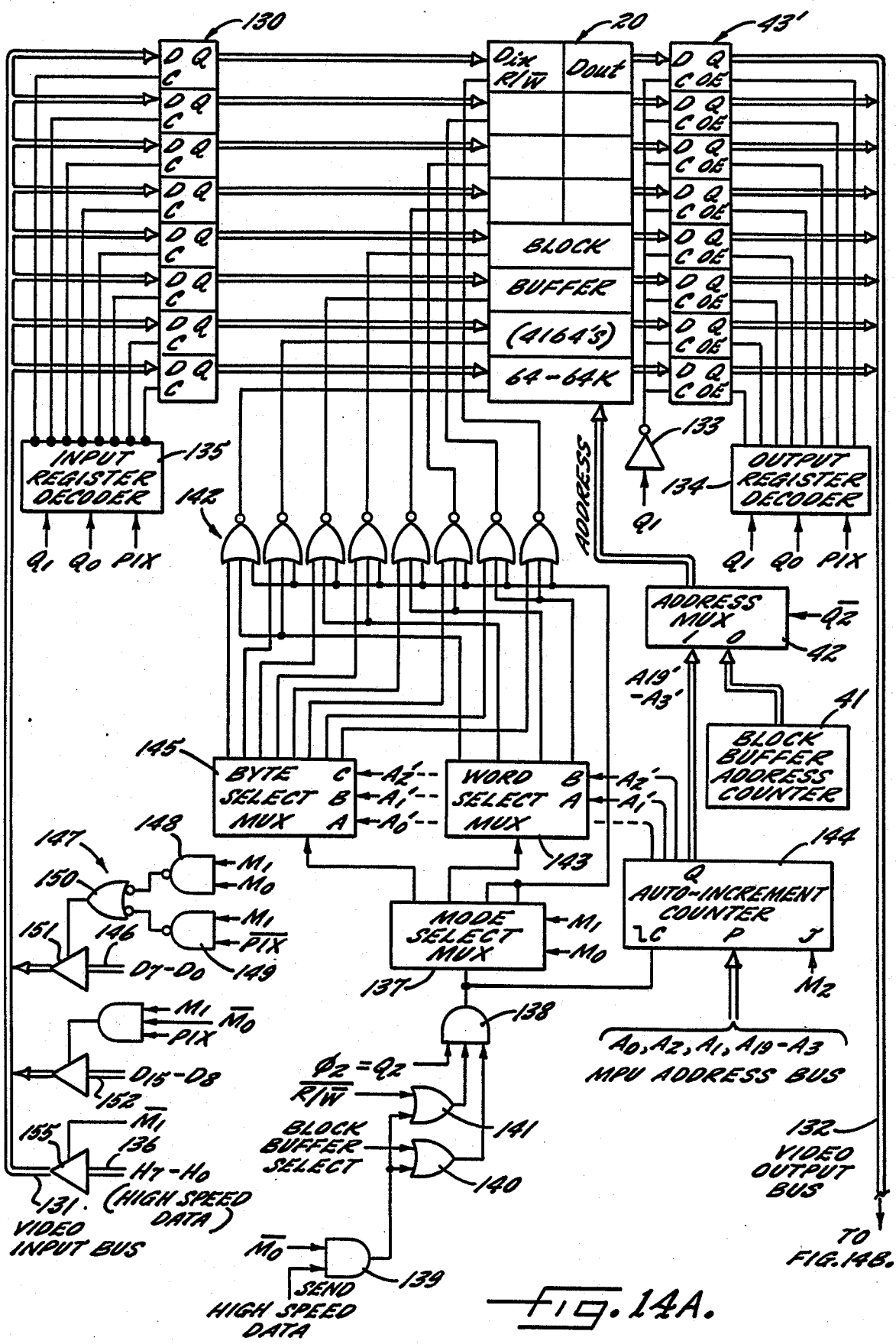
FIG. 14A and 14B is a functional block diagram of a modified block buffer and decoding system employing high speed data busses and suitable for use in place of certain portions of the system illustrated in FIG. 5.
Figure 14B:
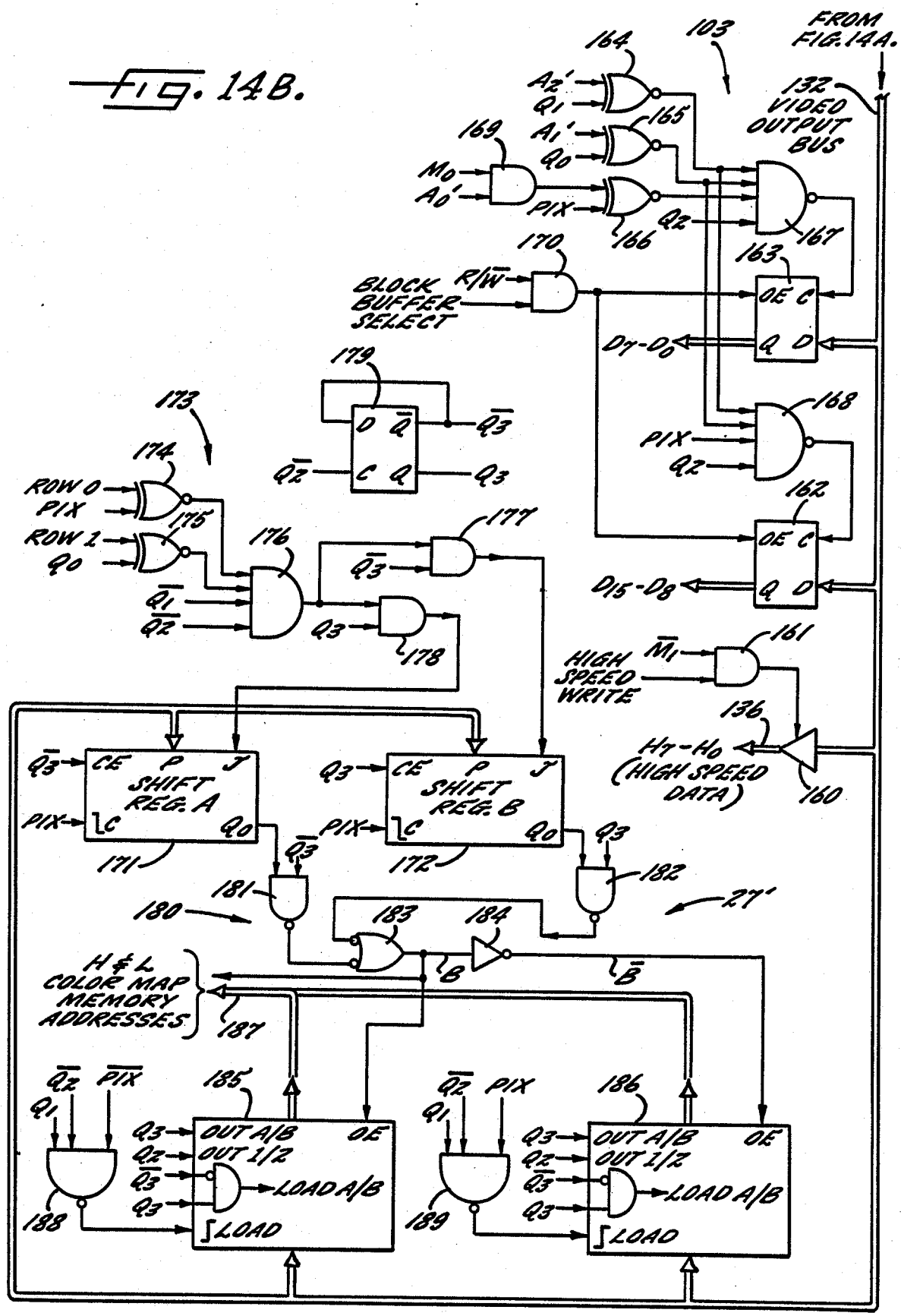

The ability of the block buffer interface circuits in FIG. 6 to transfer data to and from the block buffer 20 is substantially limited, even though there are a large number of parallel data paths to the block buffer. By using a video bus organization as shown in FIGS. 14A and 14B, the number of parallel lines to the block buffer 20 and the decoder 27 may be reduced, thereby simplifying printed circuit board layout, while at the same time enhancing data transfer. As shown in FIG. 14A, parallel paths to the 64 bits of the block buffer 20 are required only to connect the 64K dynamic RAM's to a set of 8-bit input latches 130 for data input to the block buffer, and to a set of 8-bit tristate output latches 43' for output of data from the block buffer. The inputs to the input registers 130 are all in parallel, and the outputs from the output data latches 43' are also in parallel, forming an 8-bit video input bus 131 and an eight-bit video output bus 132, respectively.

The video input bus 131 is sequentially scanned and its data latched into one of the input registers 130 as specified by the binary value of ($Q_1$, $Q_0$, PIX). The data outputs of the block buffer RAM's are all strobed into the output registers 43' at 320-nanosecond intervals, coincident with the trailing edge of $Q_1$ as supplied by an inverter 133. The contents of the output registers 43' are sequentially multiplexed onto the video output bus 132 at the 80-nanosecond pixel rate. Thus, the block buffer 20 may be accessed from either the video input bus 83 or the video output bus 84 at a byte transfer rate of 80 nanoseconds.

Figure 15:
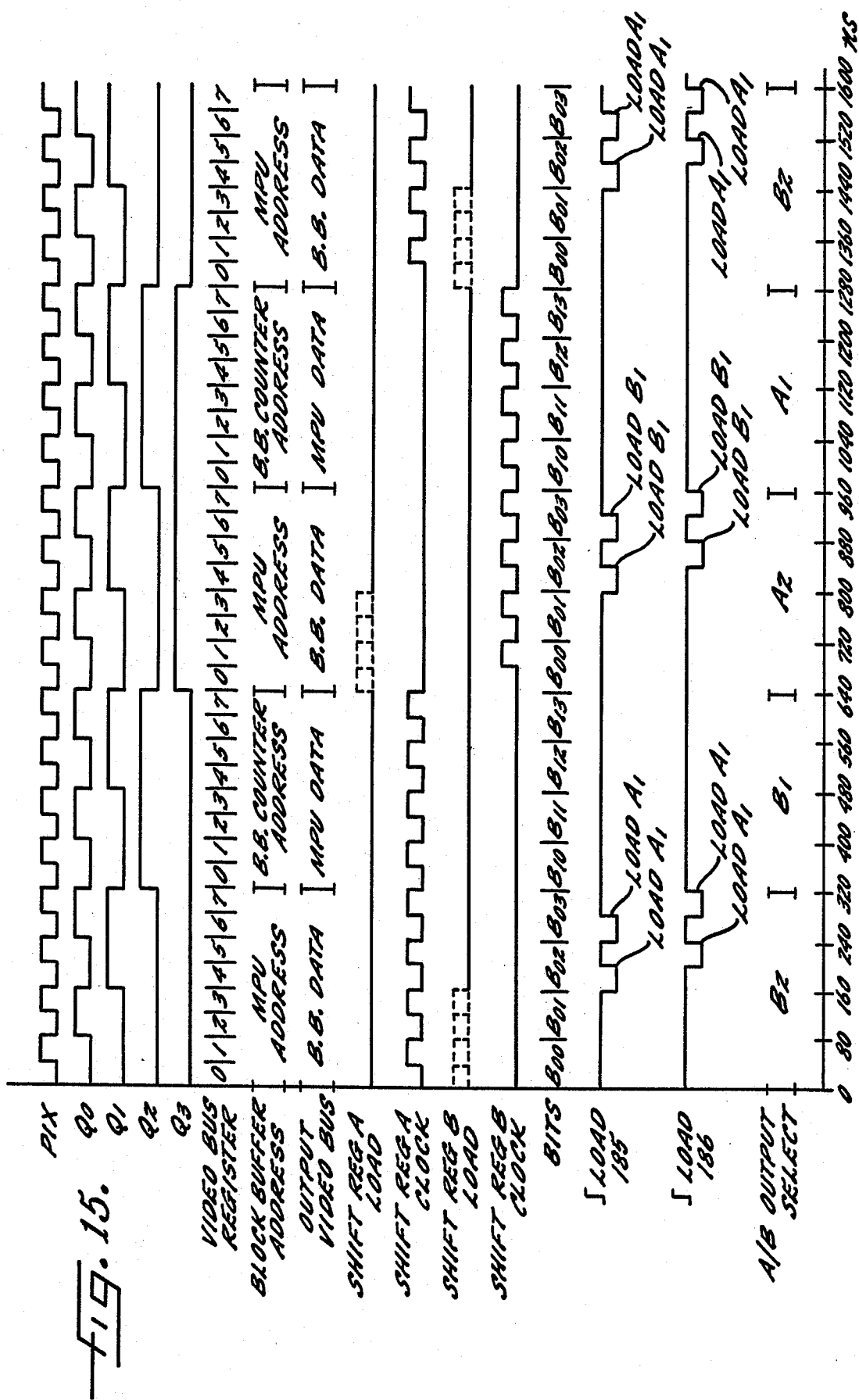
FIG. 15 is a timing diagram illustrating the operation of certain portions of the system illustrated in FIGS. 14A and 14B.

An output register decoder 134 sequentially enables the individual output registers 43' according to the value of the binary number represented by the three signals $Q_0$, $Q_1$ and PIX, while an input decoder 135 sequentially enables the individual input registers 81 in response to the same three signals $Q_0$, $Q_1$ and PIX. The particular register or byte of the 64-bit block buffer word being held on the video buses at any given instant is specified by the binary value of ($Q_1$, $Q_0$, PIX), as shown in the timing diagram of FIG. 15. A register receiving data passed over the video input or output bus during states when PIX is a logical 0 are clocked by a 0 to 1 transition of the pixel clock PIX, while data passed over the video input or output bus during states when PIX is a logical 1 are clocked by a 1 to 0 transition of the pixel clock. This method eliminates the need for a data clock at twice the pixel frequency.

Data on the output video bus for the decoder as addressed by the block buffer address counter 41 is alternately interleaved every 320 nanoseconds with data addressed by the microprocessor. The microprocessor has several modes for addressing the data in the block buffer. These modes are determined by bits $M_0$, $M_1$, and $M_2$ which may be provided by an output register accessed by the microprocessor. If the mode bit $M_1$ is a logical zero, then all eight bytes of data on the video input bus 131 for a 320-nanosecond memory cycle interval are written into or read out of the block buffer 20, and the video input bus is coupled to a high-speed data bus 136. The positive and negative transitions on the PIX clock provides a data clock for the high-speed data bus 136. If the mode bit $M_0$ is a logical one, then the microprocessor has access to the block buffer on either a 16-bit word basis or an 8-bit byte basis depending on whether the mode bit $M_1$ is a logical zero or a logical one, respectively.

Selection among the high-speed mode, the word-select mode, or the byte-select mode is performed by a mode-select multiplexer 137 which gates write pulses from an AND gate 138 to the $R/\overline{W}$ input of the block buffer memory. An AND gate 139 and OR gates 140 and 141 enable the AND gate 138 when the block buffer is selected for any write mode. In the high-speed data mode, the write pulses are applied to all the $R/\overline{W}$ inputs of the block buffer memory 20 through a bank of NOR gates 142. In the 16-bit word mode, a word-select multiplexer 143 applies the write pulses to a selected pair of block buffer registers depending on the logical values of the second and third least significant address bits $A'_1$, $A'_2$ from an auto-increment counter 144 (to be described below).

In the byte mode, a byte-select multiplexer 145 applies the write pulses to a particular single-byte register of the block buffer 20 as selected by the three least significant address bits $A_2'$, $A_1'$ and $A_0'$ from the auto-increment counter 144. A third mode bit $M_2$ controls the load input of the auto-increment counter 144. When the mode bit $M_2$ is a logical one, the MPU address bus is loaded into the auto-increment counter 144, and passes to the output address bits $A_{19}'-A_0'$. But if the mode bit $M_2$ is a logical zero, the address on the microprocessor address bus is irrelevant, and the address stored in the auto-increment counter is incremented after each write to the block buffer memory 20. The auto-increment feature is especially important in the high-speed data mode to perform a direct memory transfer to the block buffer at a rate faster than the microprocessor can update its address bus. The outputs on the auto-increment counter 144 are ordered with the three least significant address bits appearing on the three most significant address auto-increment counter 144 outputs so that in the auto-increment mode for byte-write or word-write, the microprocessor can transfer an entire 64K × 64 bits using either the byte-write or word-write functions together with the auto-increment addressing mode.

In the byte-write mode, data from a low-byte data bus 146 is applied to the video input bus 131 by input interface logic generally designated 147 comprised of function selecting NAND gates 148, 149, 150 and a tristate diver 151. During the word-write mode a high-byte data bus 152 is alternately applied to the video input bus along with the low byte, interleaved at the 80-nanosecond pixel rate, using the combination of the input circuits generally designated 147 along with a function selecting AND gate 153 and a tristate driver 154. In the high-speed data write mode, the complement of high-speed mode select bit $M_1$ directly enables a tristate driver 155.

The output circuits shown in FIG. 14B for the high-speed data read function similarly comprise a tristate buffer 160 coupling the video output bus 132 to the high-speed data bus 136 during the high-speed read function. An AND gate 161 enables the tristate driver 160. For a byte-read or word-read function, the required output bit or output byte is sampled at the required 80-nanosecond time window and held in a high-byte latch 162 and a low-byte latch 163. The proper 80-nanosecond time window is selected by logic circuits generally designated 103, including exclusive NOR gates 164, 165, 166 for comparing the binary state bits $Q_1$, $Q_2$, PIX to the least significant address bits $A_2'$, $A_1'$, $A_0'$, respectively, clock enabling NAND gates 167, 168 and function selecting AND gates 169, 170.

In the video bus design of FIGS. 14A and 14B, the number of parallel lines in the decoder is substantially reduced. The decoder 27' uses a pair of shift registers 171 and 172 to shift out the individual pixel bits B, instead of the multiplexer 103 used in the embodiment of FIG. 6. The operation of the shift register 171 is interleaved with the operation of shift register 172 so that when register 171 is receiving parallel data on its parallel input, register 172 is shifting out previously stored pixel bits B in serial fashion, and vice versa. Logic circuits generally designated 173, including a pair of exclusive NOR gates 174, 175 for comparing the row address ROW1, ROW0 to the state address $Q_0$, PIX, and AND gates 176, 177, 178 enable the load inputs of the shift registers 171, 172 at the proper time instant to pick off the pixel bits B from the required individual one of the first four byte registers of the block buffer 20. The interleaving operation of the shift registers 171 and 172 occurs at a 1280-nanosecond rate and, therefore, a D flip-flop is configured as a binary counter 179 to generate a binary signal $Q_3$ at this required rate. The binary signal $Q_3$ alternately enables the clock enable input CE and load inputs J of the shift registers 171, 172 and also operates an output multiplexer generally designated 180 including NAND gates 181, 182, 183 and an inverter 184 for combining the intermittent serial data streams from the shift registers 171, 172 into a continuous stream of pixel bits B and complement bits $\overline{B}$.

Depending on the instantaneous values of the pixel bits, either a high address or a low address is selected from a respective one of two multi-level pipeline registers 185 and 186 (e.g., type AM29520 made by Advanced Micro Devices Corporation). Each of these multi-level pipeline registers 185, 186 is equivalent to and replaces four D-type latch registers and associated clock steering and multiplexer circuits. The operation of these multi-level pipeline registers is best understood with reference to the last three lines of the timing diagram in FIG. 15. Multilevel pipeline register 185 loads its $A_1$ register coincident with the appearance of the contents of register 4 on the video output bus, corresponding to the high memory map address for the first four selected block buffer bits B shifted out of the shift registers 171 and 172. Register $A_1$ is again loaded coincident with the appearance of the contents of block buffer register 6 on the video output bus and the previous contents of register $A_1$ are moved to register $A_2$. While the $A_1$ and $A_2$ registers are being loaded, registers $B_2$ or $B_1$ are selected for output depending on the state of $Q_3$.

The output of pipeline register 185 is enabled if the value of the pixel bit B is equal to a logical one. The other multilevel pipeline register 186 functions in a similar manner, except that it is loaded with the low memory map addresses received from register 5 or 7, and its output is enabled by the inverted value of B. The selected data is applied to the color map memory address bus 187. NAND gates 188 and 189 enable the loading of the pipeline registers 185 and 186, respectively.

Another advantage of the video bus structure is that a plurality of slave microprocessors may access the block buffer 20 via the video bus. Since the data transfer rate on the video bus is about eight times faster than the data transfer rate of most microprocessors, up to eight slave processors can access the block buffer without substantial contention.

The asynchronous interface circuits for one slave processor are shown in FIG. 16A. The slave processor 200, e.g., a Z8000 16-bit microprocessor, has its own address decoder 201 and generates its own $R/\overline{W}$ and I/O WRITE signals. The I/O WRITE signal is used for synchronizing write operations from the slave processor 200, in the same manner that $\phi_2$ is used for write operations from the "master" microprocessor 21. The asynchronous interface in general comprises a bank of eight input registers 202, a bank of eight output registers 203, and handshake logic 204.

The slave processor writes an entire 64-bit word to the block buffer 20 by loading the output registers 203, loading an address register 205, and finally writing to the I/O REQ. address location detected by the address decoder 201. The slave processor must, however, read from a DONE address location and check the value of bit $D_0$ before performing another block buffer I/O operation. The DONE signal on bit $D_0$ is generated by the handshake logic to signal that the 64-bit word has been received by the block buffer 20, and $D_0$ is a logical 1 whenever the interface is performing an I/O operation with the block buffer.

For a block buffer read operation, the slave processor first loads the address register 205, and then reads from the I/O REQ. address location to request the block buffer 20 to read the 64-bit word of data at the address from the address register 205. The slave processor reads the DONE address and tests $D_0$ to determine whether the block buffer 20 has read the desired data word. When $D_0$ is low, the requested word has been loaded into the input register 202 and the microprocessor can read selected bytes by addressing and reading byte-size portions of the input register.

The output register 203 has an associated AND gate 206 for generating a write pulse and a write register multiplexer 207 for selecting a pair of bytes in the output register 203, as designated by slave processor address bits $A_1{}^S$, and $A_1{}^S$, to receive a 16-bit word of data from the slave processor 200. The slave processor addresses the output register 203 or the input register 204 at a high address location detected by the address decoder 201 and indicated by an I/O REQ. signal. Similarly, the slave processor reads a particular pair of bytes from the input register 202 as selected by a read register decoder 208 depending on slave address bits $A_1{}^S$ and $A_1{}^S$. An AND gate 209 enables a tristate driver 210 to assert the selected pair of bytes on the two byte data bus when the I/O REQ. and $R/\overline{W}$ signals are high.

The contents of the output register 203 are fed a byte at a time to the video input bus when the slave processor 200 has indicated that write data is available and when prioritizing circuits in FIG. 16B allocate a 320 nanosecond video bus time slot to the particular "Nth" slave processor 200, as signalled by an I/O SERVICE N signal. An AND gate 211 enables the outputs of register 203, and an output register multiplexer 212 sequentially enables byte-size portions of the output register 203. Similarly, bytes are sequentially clocked into the read register 202 from the video output bus 132 when the I/O SERVICE N signal is active and when the slave processor requests read data. An AND gate 213 and an output register multiplexer 214 generate the sequential clocking signals to the read register 202. The contents of the address register 205 are asserted on a video address bus 215 during either a read or write operation on the block buffer 20, as detected by an AND gate 216. The address register 205 accepts the desired block buffer address when clocked by a write pulse generated by an AND gate 217. The slave interface circuit requests either a read or write operation by means of a video bus read-write signal, supplied by a tristate driver 218 enabled by the I/O SERVICE N signal and receiving the write data available signal.

The handshake logic 204 is set by an I/O request from the slave processor and reset when the last byte (byte 7) has been transferred over the video input or output bus. The clock pulse is generated by an AND gate 219 and applied to separate D flip-flops 220, 221 active upon a read or write I/O request, respectively. An OR gate 222 is active upon either a read or write operation. In the embodiment shown, the slave circuits do not request the priority circuits to allocate the video bus; rather, the slave units wait their turn until receiving an I/O SERVICE N signal, and tell the priority circuits in FIG. 16B that they are finished by returning an I/O DONE N signal, generated by an OR gate 223, to the priority circuits. A tristate driver 224 enabled by an AND gate 225 tells the slave processor 200 that an I/O operation has not been completed, until the respective handshake flip-flop 220 or 221 is deactivated by the transfer of the last byte (byte 7) over the respective video bus 131, 132.

The prioritizing circuits are shown in FIG. 16B. An address decoder 230 and mode register 231 permit the master microprocessor 21 to regulate the exchange of data over the video busses. The mode register 231 is clocked by an AND gate 232 to receive write data from the master processor 21. The slave processors access the video busses when the high speed mode bit M1 is set low, disabling a tristate driver 233 to remove the master address for substitution of a slave processor address on the video address bus 215. Also, a read-write multiplexer 234 controlled by an inverter 235 substitutes the video bus read-write signal for the master processor's readwrite signal.

The video I/O busses 131, 132 are sequentially allocated to the Nth slave processor as designated by a sequence selector counter 236. The sequence selector counter can be reset by the master processor 21 by a reset signal generated by an AND gate 237. The sequence selector advances to designate the next slave unit to transmit an I/O DONE signal, the current I/O DONE signal being selected by a multiplexer 238. The compliment of the high-speed mode bit $M_1$ is sent to the current slave processor by a multiplexer 239 controlled by the state of the sequence selector 236, and is used as the I/O SERVICE N signal.

As noted above, the microprocessor need not be concerned with the decoding and display of data in the block buffer, except that certain decoding parameters such as the starting addresses for the rows of pixel blocks or the color values in the color map memory should be changed only during the vertical retrace interval. For loading the block buffer, data need only be successively and sequentially transferred from the microprocessor memory 23 to the block buffer 20. This is done, for example, by using one of the microprocessor's indexing registers as a pointer that is incremented after the transfer of each byte or word so that the microprocessor memory addresses and corresponding block buffer addresses are sequentially accessed.

Figure 17:
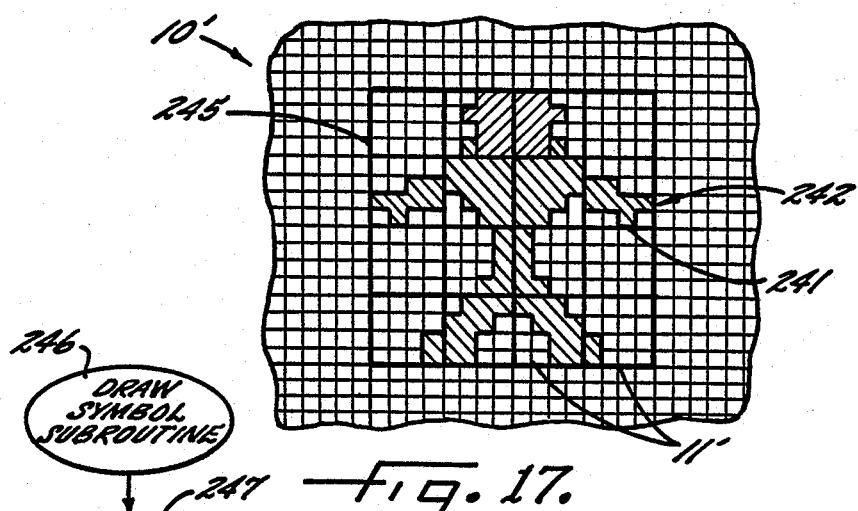
FIG. 17 is a pictoral diagram of a game symbol comprised of eight pair of 4×4 pixel blocks.
Figure 18:
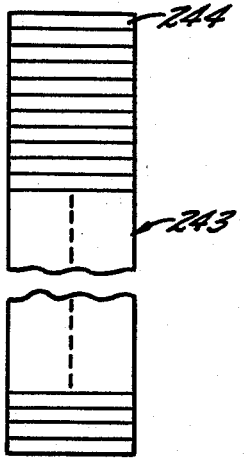
FIG. 18 is a symbolic representation of an array of memory locations defining the game symbol depicted in FIG. 17.

The periodic word organization of the block buffer simplifies the manipulation of the coded data stored therein. Game symbols in particular are easily stored and translated in the block buffer resulting in an animated display. As shown in FIG. 17, a fixed size game symbol 241 is comprised of a predefined matrix of pairs of pixel blocks 11' corresponding to a predetermined set of block buffer words. Thus, the organization of the symbol into a set of block buffer words exploits the particular organization of the block buffer 20. The symbol 241 is shown having a rectangular array of eight block pairs 11' defining a symbol window 242 of eight 64-bit block buffer words. The 512 bits of information contained in the symbol window 242 are thus mapped into 64 sequential bytes of microprocessor memory 23 defining a symbol 243 illustrated in FIG. 18. This symbol array 243 is referenced by the starting address of the first byte 244 in the array 243.

The particular organization of the block buffer 20 is further exploited in the manipulation of the symbol 241 if the symbol 241 is moved so that the pairs of symbol pixel blocks 11' always fall within individual words of the block buffer 20. In other words, the boundaries of the symbol 241 preferably fall on the boundaries between pairs of pixel blocks 11' coded as individual 64-bit block buffer words. For some game symbols, discontinuities in the position of the game symbols as the symbols move may be undesirable. In such a case either increased hardware for overlaying symbols or relatively slow software for modifying both the encoding of the symbol and the encoding of the background is required for removing the discontinuities. Because of these considerations, advanced video games employing the present invention would preferably have certain background symbols aligned with the block buffer word boundaries and also certain symbols manipulated by overlay hardware. The overlaid symbols are positioned using hardware registers and given priority over or mixed with the block buffer data after the block buffer data is decoded into individual pixels. These overlaid symbols are commonly referred to as "sprites" in the art of video game design, and the sprite pixels are preferably serially combined with the decoded background pixels in the conventional and known fashion. The use of overlaid symbols is further described in Ciarcia, Steve, "High-Resolution Sprite-Oriented Color Graphics," *BYTE*, August 1982, pp. 57–80.

For encoding the sprite symbols it is preferable to encode the individual pixels in the sprite symbols, with color map memory addresses, so that either the address from the decoder 27 or the address from the sprite generating hardware is fed to the address input lines of the color map memory 28, depending on priority. One particularly useful method for assigning priority is to give priority to the address having the largest numerical value. In other words, the colors of high priority symbols are stored at high addresses in the color map memory, while the colors of low priority symbols are stored at lower addresses. If, for example, a sprite pixel address has a value of 100 while a decoded pixel address has a value of 99, the sprite pixel address is fed to the color map memory instead of the decoded pixel address. The comparison to determine which pixel address has the greatest numerical value is performed in real time by a comparator circuit, the output bit being an indication of the highest address. The most significant bit is then used to select the higher address to be applied to the input lines to the color map memory, for example, using an address multiplexer accepting the most significant bit on its control input.

Figure 19:
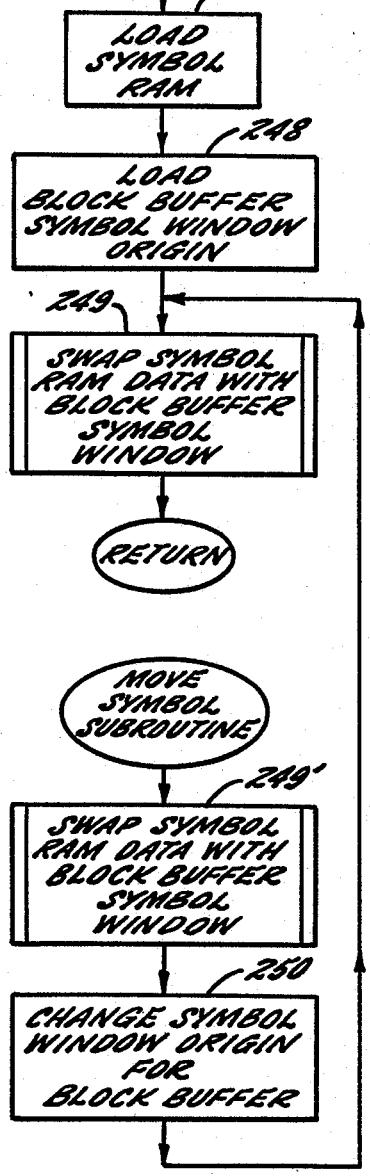
FIG. 19 is a flow chart of a procedure for loading and moving the game symbol depicted in FIG. 17.

To efficiently and quickly move a symbol 241 aligned with the block buffer word boundaries, software is needed to load the coded data for generating the symbol into the block buffer at a desired symbol window origin 125 and further to move the symbol to different positions indicated by different symbol window origins. A flow chart describing an exemplary sequence of microprocessor instructions to perform this loading and moving of symbol data is shown in FIG. 19. The software is conveniently organized as a subroutine having two entry points. The subroutine is called at a first entry point 246 to draw the symbol into the block buffer starting at a predetermined symbol window origin 245. This is done by first loading the symbol RAM as indicated in step 247, for example, by sequentially transferring bytes from storage locations in the video game program to the symbol array 243 starting at the address of the first element 244 in the symbol array. Then as indicated in step 248 the RAM location of the desired block buffer symbol origin is loaded with the desired origin as supplied by the video game program. Finally, the symbol is drawn into the block buffer by swapping the symbol RAM data with the data in the block buffer symbol window 242 as indicated in step 249.

The data is swapped between the block buffer and the symbol array so that the symbol may later be moved by the process of swapping the symbol back into the symbol array, and then swapping the symbol back into the block buffer starting at a new symbol window address 245 in the block buffer. This swapping to a new block buffer origin 245 is done by first swapping the symbol RAM data with the block buffer symbol window as indicated in step 249'. Then the symbol window origin for the block buffer is changed as indicated in step 250. (Of course, the symbol itself could be changed at this time, for example, in the case of a man running wherein several symbols are used representing a plurality of arm and leg positions). Finally, the symbol RAM data in the symbol array 243 is swapped with the block buffer data in the symbol window as previously indicated in step 249.

Figure 20:
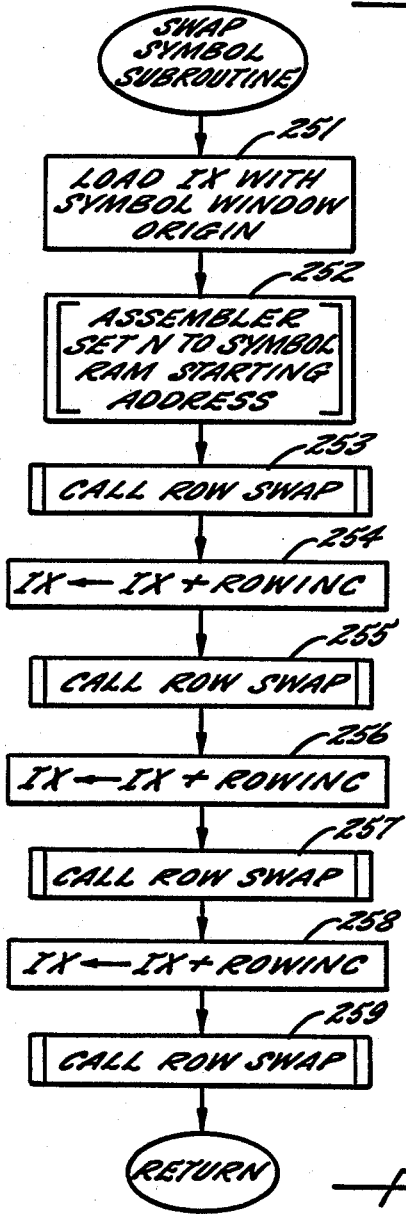
FIG. 20 is a flow chart of a subroutine for swapping the symbol depicted in FIG. 17 between the symbol array of FIG. 18 and the block buffer.

In order to efficiently perform the swapping function, which consumes the largest fraction of microprocessor execution time in the procedure of FIG. 19, the swap symbol subroutine is assembled as a rather long set of individual instructions including identical sub-sets of instructions, or "macros" for swapping the rows of pixel blocks and also for swapping the individual bytes between the block buffer words in the symbol window 242 and the symbol array 243. A flow chart for the assembly language program of the swap symbol subroutine is shown in FIG. 20. The indexing register IX is used as a block buffer pointer while the symbol array 243 is assumed to be located at a fixed set of RAM locations so that a symbol array pointer is not required. This saves execution time because there is no need to spend time incrementing the symbol array pointer or testing to determine whether the symbol array pointer is at the end of the symbol array 243.

The first step 251 in the swap symbol subroutine is to load the indexing register IX with the symbol window origin. Then in step 252 the assembler sets an assembler symbol pointer N to the symbol RAM's starting address 244, as indicated in step 252. In step 253 the first row of pixel blocks in the symbol window 242 in the block buffer is swapped with the first 16 bytes of the symbol array 243. In step 254 the indexing register IX is incremented by the required number of block buffer addresses to move from the end of the first row of two block buffer words in the symbol window 242 to the first block buffer word of the second row of block buffer words in the symbol window 242. Thus, for the symbol shown in FIG. 17, the indexing register is incremented by a predetermined constant ROWINC equal to the number of block buffer bytes per row minus 16 bytes (the width of two block buffer words) plus one byte. Similarly, in step 255 the second row of block buffer words is swapped, the indexing register is incremented to the third row in step 256, the third row is swapped in step 257, the indexing register is again incremented to point to the last row in step 258, and the last row of block buffer words is swapped in step 259.

Figure 21:
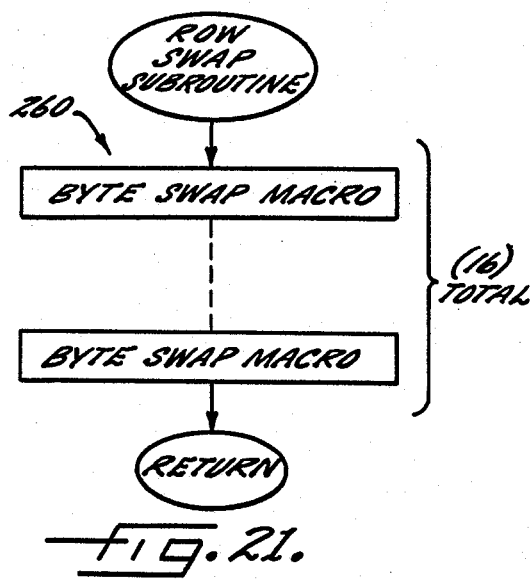
FIG. 21 is a flow chart of a row swap subroutine called by the subroutine shown in FIG. 20.

The row swap macro is illustrated in FIG. 21, and it comprises 16 byte swap macros generally designated 260.

Figure 22:
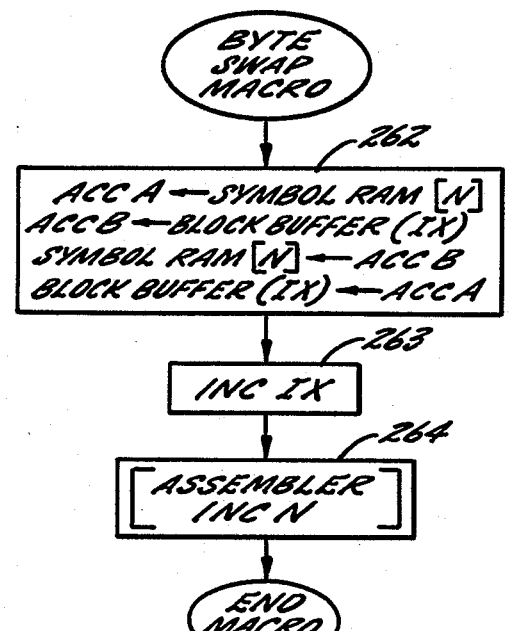
FIG. 22 is a flow chart of a byte swap macro used in the row swap subroutine of FIG. 21.

The byte swap macro is illustrated in FIG. 22. The actual swapping of bytes is shown in step 262, and is performed by reading the required symbol RAM value into one accumulator ACCA, reading the block buffer byte at the indexing register IX address into a second accumulator ACCB, writing the second accumulator ACCB to the current symbol array location, and finally writing the first accumulator ACCA to the block buffer byte addressed by the indexing register. In terms of the machine language generated by the assembler for step 262, only four instructions are generated including two direct memory read and write instructions and two indexed memory read and write instructions. Next, in step 263, the indexing register is incremented to point to the next byte. Finally, in step 264 the assembler pointer N is incremented. It should also be noted that the row swap subroutine in FIG. 21 swaps individual bytes and thus is shown for a system having only byte addressing capabilities. If a 16-bit microprocessor is used and the block buffer may be addressed in a 16-bit word mode, the row swap macro in FIG. 21 would comprise eight word swap macros. Hence, by using word addressing instead of byte addressing of the block buffer, the software for moving symbols on the display would execute faster and need less instruction memory than if only byte addressing of the block buffer was available.

It should be noted that in complex games, some of the symbols transferred will have a variable size or number of pixel blocks. In this case, the row swap subroutine of FIG. 21 is called at variable entry points to execute the required number of byte swap macros to swap the corresponding number of bytes in the variable length row.

Figure 23:
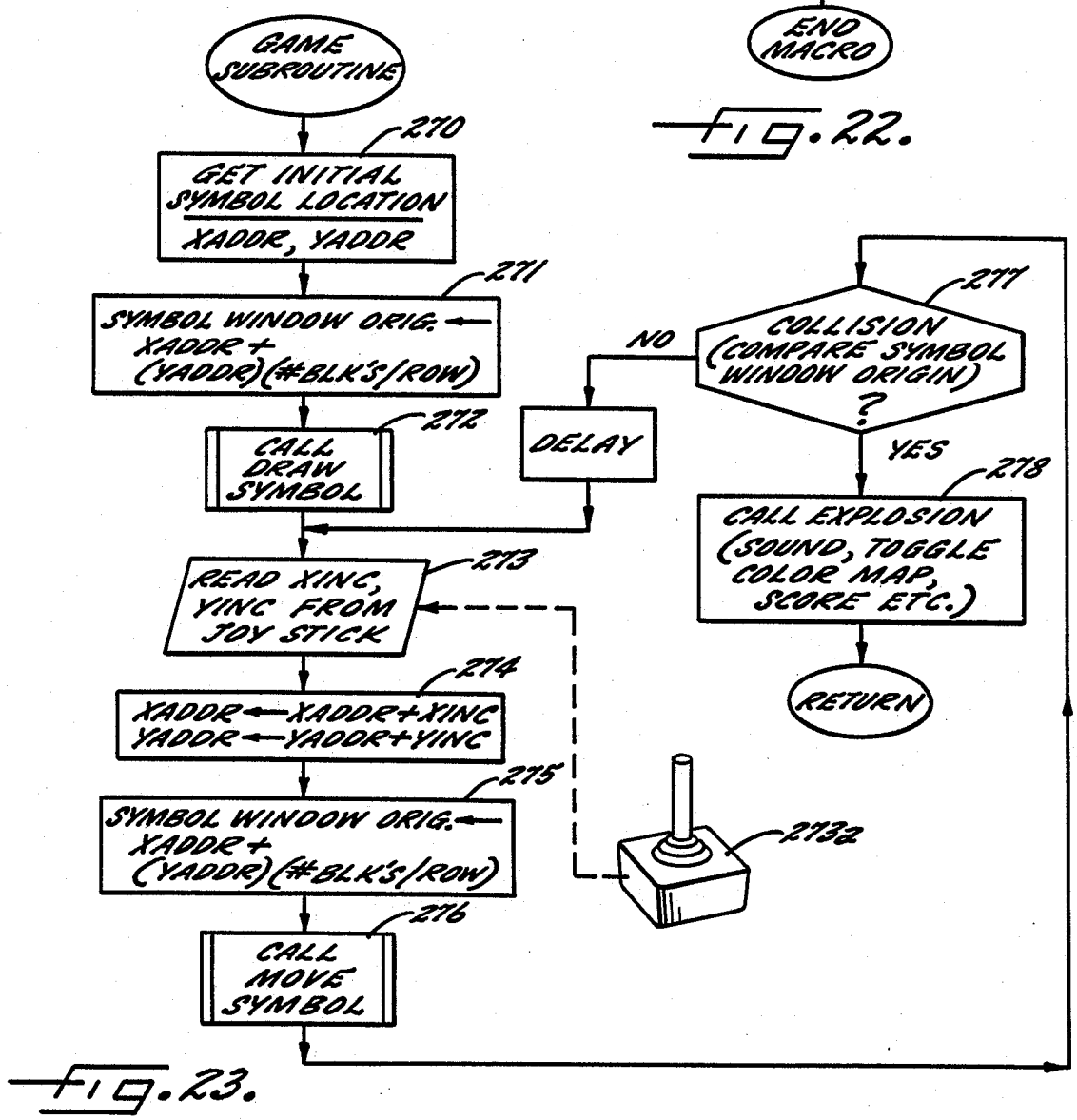
FIG. 23 is a flow chart of an elementary video game subroutine.

The use of the DRAW SYMBOL and MOVE SYMBOL subroutine in FIG. 19 is demonstrated by the GAME subroutine shown in the flowchart of FIG. 23. Assuming that the block buffer 20 already contains a background scene, for example, a maze within which the game player moves the game symbol, the first step 270 is to obtain initial block row and column coordinates for the game symbol. In step 271 the symbol window origin corresponding to the initial block row and column coordinates is calculated by multiplying the block row coordinates YADDR by the number of blocks per row and adding the product to the block column coordinate XADDR. Then in step 272 the game symbol is drawn into the block buffer so that it is displayed at the desired initial position, for example, within the background maze.

In step 273 a player-controlled joystick 273a is accessed to obtain horizontal and vertical increments, XINC and YINC, respectively, commanding specified movements of the game symbol. In step 274 the block column and row coordinates are translated by the horizontal and vertical increments, and in step 275 a symbol window origin corresponding to the new coordinates is calculated. To move the symbol to the new coordinates, the MOVE SYMBOL subroutine is called in step 276. In step 277 the game subroutine responds to the game player's input by comparing the symbol window origin to at least one predetermined pair of coordinates to detect a "collision" or coincidence of coordinates. If, for example, the game symbol has the same coordinates as a portion of the wall of the background maze, a collision of the game symbol and the wall is detected and the game subroutine responds in step 278 by alternately loading bright and dark colors into the color map, or "toggling" it to display an explosion, and generating a sound simulating an explosion. On the other hand, a collision of the game symbol with an end portion of the maze could indicate a successful end to the game subroutine so that a score is calculated in step 278, for example, by subtracting the time from the beginning of the game subroutine from a predetermined maximum score.

If no collision was detected in step 277, a delay step 279 is performed to slow down the response of the game subroutine to the game player's input and thus establish a reasonably slow speed for the movement of the game symbol. Then the game subroutine is ready to accept a new position command from the player in step 274 for repetition of the symbol movement and collision steps.

We claim as our invention:

1. A method of generating a color video display by the compression and decompression of digital data extracted from a color image to be displayed, said method comprising the steps of dividing said color image to be displayed into a matrix of blocks, each block comprising a matrix of pixels, storing data identifying a multiplicity m of different colors, said data being stored in a color map memory having a unique address for the data identifying each different color, selecting different pairs of said m colors for different blocks of the color image to be displayed, generating a pixel data bit for each pixel in each of said different blocks, the value of each pixel data bit identifying one of the pair of colors selected for the block in which the corresponding pixel is located, generating different pairs of binary numbers representing the color map memory addresses of said different pairs of said m colors selected for different blocks, reading out of the color map memory the stored data representing the particular color selected for each pixel, in response to the data bit for that pixel and the corresponding one of said binary numbers representing the address of one of the colors selected for the block containing that pixel, using the data read out of the color map memory to generate a video display comprised of pixels having the selected colors as identified by the data read out of said color map memory, and changing the data stored in the color map memory and thereby changing the video display generated by the data read out of the color map memory.

2. The method of claim 1 wherein each block comprises at least a 4×4 pixel matrix.

3. The method of claim 1 wherein the value of m is at least 256, and each of said binary numbers is at least 8 bits in length.

4. The method of claim 1 wherein said stored data identifies each of said m preselected colors by at least two binary numbers, one of said numbers identifying the intensity of the color and at least one other number identifying the hue of the color.

5. The method of claim 1 wherein said stored data representing said m colors comprises the data needed to generate a video display of a pixel having any of said m colors.

6. The method of claim 1 wherein said stored data representing said m colors includes data identifying a desired luminance level Y and two desired chrominance levels (R-Y) and (B-Y) for each of said m colors.

7. The method of claim 1 wherein said stored data representing said m colors includes data identifying desired Y, I and Q levels for each of said m colors.

8. The method of claim 1 wherein data identifying the addresses of the color pairs selected for the various blocks, and the data bits for the various pixels in each block, are stored in a block buffer memory from which said data can be read out in a desired sequence to address said color map memory, and which includes the step of reading said data out of said block buffer memory in the desired order of appearance of said pixels in a video display generated therefrom.

9. The method of claim 8 which includes the step of changing the data stored in said block buffer memory for selected blocks or selected pixels to produce an animated video display.

10. The method of claim 8 wherein the data stored in said block buffer memory comprises the pixel data bits and the color map memory address data for the entire matrix of blocks in at least one frame of the desired video display.

11. The method of claim 8 wherein the pixel data bits and the color map memory address data for each block are stored in a common address location in said block buffer memory, and which includes the steps of addressing said block buffer memory in the order in which the pixels represented by the data therein are to be generated in the video display, reading out of each addressed location of the block buffer memory two separate data bytes representing the two selected color map addresses for the corresponding block, and reading successive pixel data bits from the addressed location of the block buffer memory and transmitting to the color map memory a corresponding one of the two data bytes representing the two selected color map addresses, the value of each pixel data bit determining which of the two data bytes is transmitted to the color map memory.

12. The method of claim 8 wherein the chrominance data read out of said color map memory for each of said m colors is transformed by gain and offset values stored in a color space transformation memory, said gain and offset values being selected according the value of the luminance data read out of the color map memory.

13. The method of claim 1 wherein said stored data representing said m colors includes data identifying the primary color components R, G and B for each said m colors.

14. A method of generating animated color video graphics by the compression and decompression of digital data extracted from the color images to be displayed, said method comprising the steps of producing multiple color images from a multiplicity m of preselected colors, dividing each image to be displayed into a matrix of blocks, each block comprising a matrix of pixels, storing data identifying a multiplicity m of different colors in a color map memory having a unique address for the data identifying each different color, said data indentifying a desired luminance level Y and two desired chrominance levels (R-Y) and (B-Y) for each of said m colors, selecting different pairs of said m colors for different blocks of the color image to be displayed, generating a pixel data bit for each pixel in each of said different blocks, the value of each pixel data bit identifying one of the pair of colors selected for the block in which the corresponding pixel is located, generating different pairs of binary numbers representing the color map memory addresses of said different pairs of said m colors selected for different blocks, storing the data identifying the addresses of the color pairs selected for the various blocks, and the data bits for the various pixels in each block, in a block buffer memory from which said data can be read out in a desired sequence to address said color map memory, reading said data out of said block buffer memory in the desired order of appearance of said pixels in a video display to be generated therefrom, reading out of the color map memory the stored data representing the particular color selected for each pixel, in response to the value of the data bit for that pixel and the corresponding one of said binary numbers representing the address of one of the colors selected for the block containing that pixel, using the data read out of the color map memory to generate a video display comprised of pixels having the selected colors as identified by the data read out of said color map memory, periodically changing the data stored in said block buffer memory for selected blocks or selected pixels to produce an animated video display, and changing the data stored in the color map memory and thereby changing the video display generated by the data read out of the color map memory.

15. Apparatus for generating a color video display by the compression and decompression of digital data extracted from a color image to be displayed, said apparatus comprising the combination of a color map memory for storing data identifying a multiplicity m of different colors and having a unique address for the data identifying each different color, means for generating a pixel data bit for each pixel in a color image divided into a matrix of blocks, each block comprising a matrix of pixels, the value of each pixel data bit identifying one of a pair of said m colors selected for the block in which the corresponding pixel is located, means for generating different pairs of binary numbers representing the color map memory addresses of said different pairs of said m colors selected for different blocks, means for reading out of said color map memory the stored data representing the particular color selected for each pixel, in response to the data bit for that pixel and the corresponding one of said binary numbers representing the address of one of the colors selected for the block containing that pixel, means for generating a video display comprised of pixels having the selected colors as identifed by the data read out of said color map memory, and means for changing the data stored in the color map memory and thereby changing the video display generated by the data read out of the color map memory.

16. The method of claim 15 wherein each block comprises at least a 4×4 pixel matrix.

17. The apparatus of claim 15 wherein the value of m is at least 256, and each of said binary numbers is at least 8 bits in length.

18. The apparatus of claim 15 wherein said stored data identifies each of said m preselected colors by at least two binary numbers, one of said numbers identifying the intensity of the color and at least one other number identifying the hue of the color.

19. The apparatus of claim 15 wherein said stored data representing said m colors comprises the data needed to generate a video display of a pixel having any of said m colors.

20. The apparatus of claim 15 wherein said stored data representing said m colors includes data identifying a desired luminance level Y and two desired chrominance levels (R-Y) and (B-Y) for each of said m colors.

21. The apparatus of claim 15 wherein said stored data representing said m colors includes data identifying desired Y, I and Q levels for each of said m colors.

22. The apparatus of claim 15 which includes a block buffer memory for storing data identifying the addresses of the color pairs selected for the various blocks, and the data bits for the various pixels in each block, and means for reading said data out of said block buffer memory in the desired order of appearance of said pixels in a video display generated therefrom.

23. The apparatus of claim 22 which includes means for changing the data stored in said block buffer memory for selected blocks or selected pixels to produce an animated video display.

24. The apparatus of claim 22 wherein the data stored in said block buffer memory comprises the pixel data bits and the color map memory address data for the entire matrix of blocks in at least one frame of the desired video display.

25. The apparatus of claim 22 wherein the pixel data bits and the color map memory address data for each block are stored in a common address location in said block buffer memory, and which includes means for addressing said block buffer memory in the order in which the pixels represented by the data therein are to be generated in the video display, means for reading out of each addressed location of the block buffer memory two separate data bytes representing the two selected color map addresses for the corresponding block, and means for reading successive pixel data bits from the addressed location of the block buffer memory and transmitting to the color map memory a corresponding one of the two data bytes representing the two selected color map addresses, the value of each pixel data bit determining which of the two data bytes is transmitted to the color map memory.

26. The apparatus of claim 22 which includes means for transforming the chrominance data read out of said color map memory for each of said m colors by gain and offset values stored in a color space transformation memory, said gain and offset values being selected according the value of the luminance data read out of the color map memory.

27. A digital color video system as set forth in claim 16 for displaying animated color video graphics, said system including microprocessor means operatively associated with said block buffer memory for changing the data therein for selected blocks or selected pixels to produce an animated video display.

28. A method of generating animated color video graphics by the compression and decompression of digital data extracted from the color images to be displayed, said method comprising the steps of producing multiple color images from a multiplicity m of preselected colors dividing each image to be displayed into a matrix of blocks, each block comprising a matrix of pixels, storing data identifying a multiplicity m of different colors in a color map memory having a unique address for the data identifying each different color, said data identifying a desired luminance level Y and two desired chrominance levels (R-Y) and (B-Y) for each of said m colors, selecting different pairs of said m colors for different blocks of the color image to be displayed, generating a pixel data bit for each pixel in each of said different blocks, the value of each pixel data bit identifying one of the pair of colors selected for the block in which the corresponding pixel is located, generating different pairs of binary numbers representing the color map memory addresses of said different pairs of said m colors selected for different blocks, storing the data identifying the addresses of the color pairs selected for the various blocks, and the data bits for the various pixels in each block, in a block buffer memory from which said data can be read out in a desired sequence to address said color map memory, reading said data out of said block buffer memory in the desired order of appearance of said pixels in a video display to be generated therefrom, reading out of the color map memory the stored data representing the particular color selected for each pixel, in response to the value of the data bit for that pixel and the corresponding one of said binary numbers representing the address of one of the colors selected for the block containing that pixel, using the data read out of the color map memory to generate a video display comprised of pixels having the selected colors as identified by the data read out of said color map memory, periodically changing the data stored in said block buffer memory for selected blocks or selected pixels to produce an animated video display, and changing the data stored in the color map memory and thereby changing the video display generated by the data read out of the color map memory.

29. A digital color video system for displaying images which have been divided into a matrix of blocks, each block comprising a matrix of pixels, said system using the compression and decompression of digital data extracted from said images and comprising a color map memory for storing data for generating a video display of pixels having any of a multiplicity m of different preselected colors, the data for each of said m colors having a separate address in said color map memory, a block buffer memory for receiving and storing encoded data representing different pixel color patterns for different blocks, the encoded data for a given block including a pair of binary numbers representing addresses for two of said m preselected colors, a code bit for each pixel in the block, the value of said code bit representing one of the two colors whose addresses are represented by said pair of binary numbers, means for reading said binary numbers out of said block buffer memory and transmitting to said color map memory one of said binary numbers for each pixel represented by a code bit, said binary numbers being transmitted in the same order in which the corresponding pixels are to be generated in the video display, means for reading out of said color map memory the color data stored at the addresses represented by said binary numbers transmitted to said color map memory, means for generating a video display comprising pixels having colors determined by the data read out of said color map memory, and means for changing the data stored in the color map memory and thereby changing the video display generated by the data read out of the color map memory.

30. A digital color video graphics system as set forth in claim 29 wherein said block buffer memory stores encoded data for the entire matrix of blocks in at least one complete frame of a desired video display.

31. A digital color video system as set forth in claim 29 wherein the data stored in said color map memory comprises the data needed to generate a video display of a pixel having any of said m colors.

32. A digital color video system as set forth in claim 29 wherein the data stored in said color map memory includes data identifying a desired luminance level Y and two desired chrominance levels (R-Y) and (B-Y) for each of said m colors.

33. A digital color video system as set forth in claim 29 wherein the data stored in said color map memory includes data identifying desired Y, I and Q levels for each of said m colors.

34. A digital color video system as set forth in claim 29 wherein the data stored in said block buffer memory comprises the pixel code bits and the color map memory address data for the entire matrix of blocks in at least one frame of the desired video display.

35. A digital color video system as set forth in claim 29 wherein the pixel data bits and the color map memory address data for each block are stored in a common address location in said block buffer memory, and which includes means for addressing said block buffer memory in the order in which the pixels represented by the data therein are to be generated in the video display, means for reading out of each addressed location of the block buffer memory two separate data bytes representing the two selected color map addresses for the corresponding block, and means for reading successive pixel code bits from the addressed location of the block buffer memory and transmitting to the color map memory a corresponding one of the two data bytes representing the two selected color map addresses, the value of each pixel code bit determining which of the two data bytes is transmitted to the color map memory.

36. A digital color video system as set forth in claim 29 which includes means for transforming the chrominance data read out of said color map memory for each of said m colors by gain and offset values stored in a color space transformation memory, said gain and offset values being selected according the value of the luminance data read out of the color map memory, reading out of said color map memory the color data stored at the addresses represented by said binary numbers transmitted to said color map memory, and generating a video display comprising pixels having colors determined by the data read out of said color map memory.

37. A method of displaying color video images which have been divided into a matrix of blocks, each block comprising a matrix of pisels, said method using the compression and decompression of digital data extracted from said images and comprising the steps of storing data for generating a video display of pixels having any of a multiplicity m of different preselected colors in a color map memory, the data for each of said m colors having a separate address in said color map memory, storing encoded data representing different pixel color patterns for different blocks in a block buffer memory, the encoded data for a given block including a pair of binary numbers representing addresses for two of said m preselected colors, a code bit for each pixel in the block, the value of said code bit representing one of the two colors whose addresses are represented by said pair of binary numbers, reading said binary numbers out of said block buffer memory and transmitting to said color map memory one of said binary numbers for each pixel represented by a code bit, said binary numbers being transmitted in the same order in which the corresponding pixels are to be generated in the video display, reading out of said color map memory the color data stored at the addresses represented by said binary numbers transmitted to said color map memory, generating a video display comprising pixels having colors determined by the data read out of said color map memory, and changing the data stored in the color map memory and thereby changing the video display generated by the data read out of the color map memory.

38. A method as set forth in claim 37 for displaying animated color video graphics, said method including changing the data in said block buffer memory for selected blocks or selected pixels to produce an animated video display.

39. A method as set forth in claim 37 wherein encoded data for the entire matrix of blocks in at least one complete form of a desired video display is stored in said block buffer memory.

40. A method as set forth in claim 37 wherein the data stored in said color map memory comprises the data needed to generate a video display of a pixel having any of said m colors.

41. A method as set forth in claim 37 wherein the data stored in said color map memory includes data identifying a desired luminance level Y and two desired chrominance levels (R-Y) and (B-Y) for each of said m colors.

42. A method as set forth in claim 37 wherein the data stored in said block buffer memory comprises the pixel code bits and the color map memory address data for the entire matrix of blocks in at least one frame of the desired video display.

43. A method as set forth in claim 37 wherein the pixel data bits and the color map memory address data for each block are stored in a common address location in said block buffer memory, and which includes the steps of addressing said block buffer memory in the order in which the pixels represented by the data therein are to be generated in the video display, reading out of each addressed location of the block buffer memory two separate data bytes representing the two selected color map addresses for the corresponding block, and reading successive pixel code bits from the addressed location of the block buffer memory and transmitting to the color map memory a corresponding one of the two data bytes representing the two selected color map addresses, the value of each pixel code bit determining which of the two data bytes is transmitted to the color map memory.

44. A method as set forth in claim 37 which includes the step of transforming the chrominance data read out of said color map memory for each of said m colors by gain and offset values stored in a color space transformation memory, said gain and offset values being selected according to the value of the luminance data read out of the color map memory.

45. A method of generating a color video display comprising the steps of dividing a color image to be displayed into a matrix of blocks, each block comprising a matrix of pixels, storing data identifying a multiplicity m of different colors, said data being stored in a plurality of selectable color map memories each having a unique address for the data identifying each different color, selecting different pairs of said m colors for different blocks of the color image to be displayed, generating a pixel data bir for each pixel in each of said different blocks, the value of each pixel data bit identifying one of the pair of colors selected for the block in which the corresponding pixel is located, generating different binary numbers representing the selectable color map memory and the color map memory addresses of said different pairs of said m colors selected for different blocks, reading out of the respective color map memories the stored data representing the particular color selected for each pixel, in response to the data bit for that pixel and the corresponding binary numbers representing the selected color map memory and the address of one of the colors selected for the block containing the pixel, and using the data read out of the color map memories to generate a video display comprised of pixels having the selected colors as identified by the data read out of said color map memories.

46. A method of generating a color video display comprising the steps of dividing a color imge to be displayed into a matrix of blocks, each block comprising a matrix of pixels, storing data identifying a multiplicity m of different colors, said data being stored in a color map memory having a unique address for the data identifying each different color, selecting different pairs of said m colors for different blocks of the color image to be displayed, generating a pixel data bit for each pixel in each of said different blocks, the value of each pixel data bit identifying one of the pair of colors selected for the block in which the corresponding pixel is located, generating different pairs of binary numbers representing the color map memory addresses of said different pairs of said m colors selected for different blocks, reading out of the color map memory the stored data representing the particular color selected for each pixel, in response to the data bit for that pixel and the corresponding one of said binary numbers representing the address of one of the colors selected for the block containing the pixel, using the data read out of the color map memory to generate a video display comprised of pixels having the selectec colors ad identified by the data read out of said color map memory, and changing the data stored in the color map memory and thereby changing the video display generated by the data read out of the color map memory.

* * * * *